US009083018B2

(12) United States Patent
Makino et al.

(10) Patent No.: US 9,083,018 B2
(45) Date of Patent: Jul. 14, 2015

(54) FUEL CELL DEVICE COMPRISING A CONTROLLER INCLUDING AN EXECUTION CONDITION SETTING SECTION

(71) Applicant: Nissan Motor Co., Ltd., Yokohama, Kanagawa (JP)

(72) Inventors: Shinichi Makino, Kawasaki (JP); Yasushi Ichikawa, Kanagawa (JP); Mitsunori Kumada, Yokosuka (JP); Takahiro Fujii, Kanagawa (JP); Ryouichi Shimoi, Yokohama (JP); Shinichi Miyazaki, Yokohama (JP); Daigo Iwasaki, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 326 days.

(21) Appl. No.: 13/778,714

(22) Filed: Feb. 27, 2013

(65) Prior Publication Data
US 2013/0224615 A1 Aug. 29, 2013

(30) Foreign Application Priority Data

Feb. 29, 2012 (JP) ................................. 2012-043866

(51) Int. Cl.
*H01M 8/02* (2006.01)
*H01M 8/04* (2006.01)
(52) U.S. Cl.
CPC ...... *H01M 8/04223* (2013.01); *H01M 8/04388* (2013.01); *H01M 8/04447* (2013.01); *H01M 8/04955* (2013.01); *H01M 8/04089* (2013.01); *Y02E 60/50* (2013.01)

(58) Field of Classification Search
CPC ..... H01M 8/02; H01M 8/04; H01M 8/04082; H01M 8/04089; H01M 8/04104; H01M 8/04223; H01M 8/04298; H01M 8/04992
See application file for complete search history.

(56) References Cited

U.S. PATENT DOCUMENTS

| 2005/0112454 A1* | 5/2005 | Gurin et al. | 429/46 |
| 2009/0029199 A1* | 1/2009 | Tao | 429/13 |
| 2009/0087702 A1* | 4/2009 | Yonekura et al. | 429/13 |
| 2011/0087441 A1* | 4/2011 | Salvador et al. | 702/24 |

FOREIGN PATENT DOCUMENTS

JP 2006-278276 A 10/2006

* cited by examiner

*Primary Examiner* — Kenneth Douyette
(74) *Attorney, Agent, or Firm* — Global IP Counselors, LLP

(57) ABSTRACT

A fuel cell system includes a fuel cell, a control valve and a controller. The controller controls the control valve to periodically increase and decrease the anode gas pressure downstream of the control valve. The controller executes a shutdown/restart operation of the fuel cell by closing the control valve to stop the anode gas and shutting down power generation of the fuel cell upon receiving a shutdown command, and restarting feeding of the anode gas and restarting the power generation upon a prescribed operation restart condition being met. The controller estimates an anode gas concentration at a location where the anode gas concentration is locally lower within a power generation region of the fuel cell based on a control state of the anode gas when the shutdown command is issued. The controller sets the prescribed operation restart condition for executing the shutdown/restart operation based on the anode gas concentration.

18 Claims, 20 Drawing Sheets

FUEL CELL DEVICE COMPRISING A CONTROLLER INCLUDING AN EXECUTION CONDITION SETTING SECTION

CROSS-REFERENCE TO RELATED APPLICATIONS

This application claims priority to Japanese Patent Application No. 2012-043866, filed in Japan on Feb. 29, 2012. The entire disclosure of Japanese Patent Application No. 2012-043866 is hereby incorporated herein by reference.

BACKGROUND

1. Field of the Invention

The present invention generally relates to a fuel cell system.

2. Background Information

In some conventional fuel cell systems, when the power generation ability of the fuel cells is low, control is carried out to shorten the power generation off time of the fuel cells (see: Japanese Laid-Open Patent Application No. 2006-278276). According to Japanese Laid-Open Patent Application No. 2006-278276, the following is disclosed: when the nitrogen concentration at the anode of a fuel cell stack is high (when the hydrogen concentration at the anode is low), when the operation is restarted, power generation becomes difficult to perform. Consequently, in order to prevent a further increase in the nitrogen concentration due to a cross leak of nitrogen from the cathode while the power generation is off, based on the impurity concentration in the upstream and downstream of the stack while off, the operation off time is set shorter when the impurity concentration is higher. Also, a disclosure is made that the operation re-shutdown prohibition time is set longer.

SUMMARY

In view of the state of the known technology, one aspect of the present disclosure is to provide an anode non-circulating system that is different from the circulating system disclosed in Japanese Laid-Open Patent Application No. 2006-278276, which normalize an extreme impurity concentration by using a circulating flow to avoid hydrogen starvation. In the anode non-circulating system, the impurities (the nitrogen and water) generated in the operation of the fuel cell are sent to a buffer tank arranged on the anode-off gas side by pulsation. However, when this system is shut down, the following problems are created.

When the system is shut down, as the hydrogen on the anode side is consumed by the oxygen that is cross-leaked from the cathode side, the pressure inside of the fuel cell stack becomes lower than the pressure on the anode-side, so that the impurity-containing gas in the anode-off gas gradually flows back. Consequently, in the power generation region when the system is shut down, there may be areas where the impurity concentration is locally higher in comparison to control by circulation. Therefore, there are cases where the system is shut down when the system should not be shut down when the power generation off time and the re-shutdown prohibition time are set based on the impurity concentration in the feeding gas and the off gas exhausted emitted the anode.

One object of the present invention is to solve the problems of the prior art by providing a fuel cell system that carries out the pulsation operation, the optimum off period (or the re-shutdown prohibition time) of the fuel cells is set.

In view of the above, an anode non-circulation type fuel cell system is provided that basically includes a fuel cell, a control valve and a controller. The fuel cell is configured to receive anode gas and cathode gas to generate electric power. The control valve is configured to control pressure of the anode gas being fed to the fuel cell. The controller includes a pulsation operation control section, a shutdown/restart control section, an anode gas concentration acquiring section and an execution condition setting section. The pulsation operation control section is configured to control the control valve so that the pressure of the anode gas flowing downstream of the control valve is periodically increased and decreased. The shutdown/restart control section is configured to execute a shutdown/restart operation of the fuel cell by closing the control valve to stop feeding of the anode gas and shutting down power generation of the fuel cell upon receiving a shutdown command to shut down the power generation, and opening the control valve to restart the feeding of the anode gas and restarting the power generation upon a prescribed operation restart condition being met. The anode gas concentration acquiring section is configured to estimate an anode gas concentration at a location where the anode gas concentration is locally lower within a power generation region of the fuel cell based on a control state of the anode gas at a time the shutdown command is issued. The execution condition setting section is configured to set the prescribed operation restart condition for executing the shutdown/restart operation of the fuel cell based on the anode gas concentration that was estimated by the anode gas concentration acquiring section.

Consequently, even when the impurity concentration becomes locally higher caused by the backflow of the impurity-mixed gas from the anode-off gas side of the fuel cell to the power generation region due to the shutdown of the operation after a power generation shutdown command is issued to the fuel cell, since the concentration at the location in the power generation region of the fuel cells where the anode gas concentration is locally lower is estimated based on a control state of the anode gas at the time of shutdown command, it is possible to restart the power generation before the impurity concentration at such location becomes too high. As a result, making an appropriate setting for the condition for executing the shutdown/restart operation is possible, and suppressing the degradation in the cathode catalyst during the power generation shutdown time is possible.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1A:
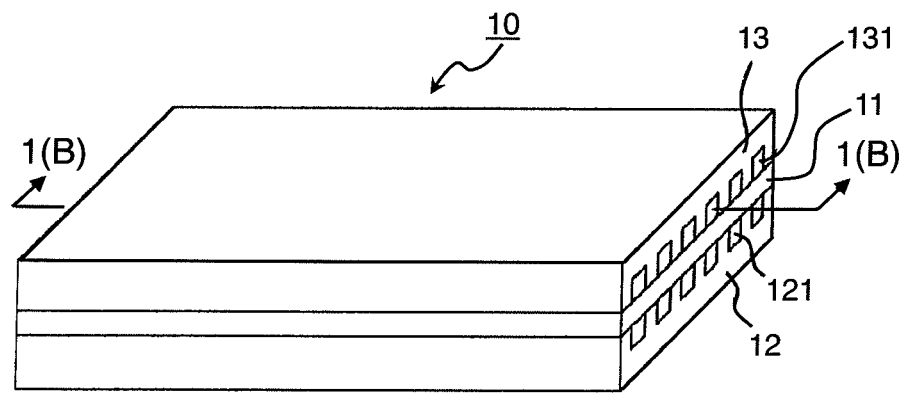
FIG. 1(A) is a simplified perspective view of a fuel cell in accordance with a first embodiment.
Figure 1B:
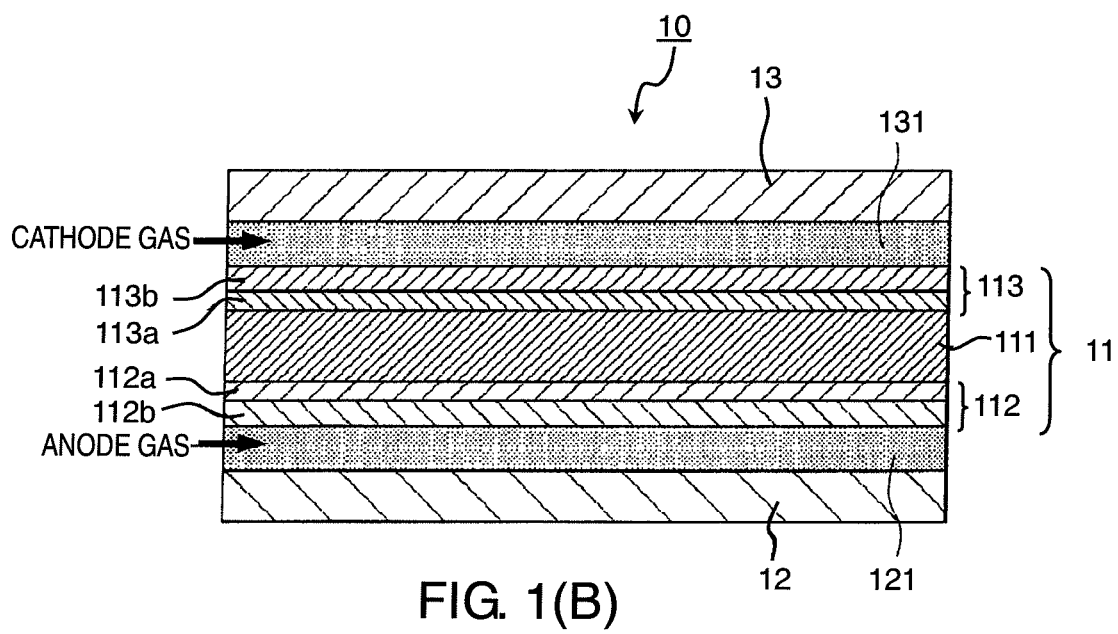
FIG. 1(B) is a simplified cross sectional view of the fuel cell that is illustrated in FIG. 1(A) as seen along section line 1(B)-1(B)

Referring initially to FIGS. 1(A) and (B), a fuel cell 10 is illustrated in accordance with a first embodiment. FIGS. 1(A) and 1(B) are diagrams explaining a basic configuration of a fuel cell system in the first embodiment. FIG. 1(A) is an oblique view of the fuel cell 10. FIG. 1(B) is a cross-sectional view of the fuel cell in FIG. 1(A) as viewed along section line 1(B)-1(B).

The fuel cell 10 has an electrolyte membrane sandwiched between an anode electrode (the fuel electrode) and a cathode electrode (the oxidizer electrode). Each fuel cell generates electric power when an anode gas (fuel gas) containing hydrogen is fed to the anode electrode and a cathode gas (oxidizer gas) containing oxygen is fed to the cathode electrode. The electrode reaction that develops in both electrodes of the anode electrode and the cathode electrode is as follows.

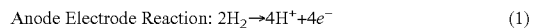

Anode Electrode Reaction: $2H_2 \rightarrow 4H^+ + 4e^-$ (1)

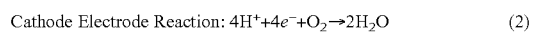

Cathode Electrode Reaction: $4H^+ + 4e^- + O_2 \rightarrow 2H_2O$ (2)

Each fuel cell generates about 1 volt of electromotive force by the electrode reactions in equations (1) and (2).

The fuel cell 10 has a configuration in which an anode separator 12 and the cathode separator 13 are arranged on the front surface and the rear surface of the membrane electrode assembly 11 (hereinafter to be referred to as the "MEA 11"), respectively. The MEA 11 includes an electrolyte membrane 111, an anode electrode 112 and a cathode electrode 113. The MEA 11 is arranged with the anode electrode 112 on one surface of the electrolyte membrane 111 and the cathode electrode 113 on the other surface. The electrolyte membrane 111 is a proton conductive ion exchange membrane made of a fluororesin. The electrolyte membrane 111 displays good electroconductivity in the wet state.

The anode electrode 112 includes a catalyst layer 112a and a gas diffusion layer 112b. The catalyst layer 112a is in contact with the electrolyte membrane 111. The catalyst layer 112a is formed from platinum or carbon black particles containing platinum, etc. The gas diffusion layer 112b is arranged on the outer side (the side facing away from the electrolyte membrane 111) of the catalyst layer 112a. The gas diffusion layer 112b is in contact with the anode separator 12. The gas diffusion layer 112b is formed from a material with a sufficiently high gas diffusion property and electroconductivity. For example, the gas diffusion layer 112b can be formed from a carbon cloth woven from yarns made of carbon fibers or a carbon paper.

Similar to the anode electrode 112, the cathode electrode 113 also includes a catalyst layer 113a and a gas diffusion layer 113b.

The anode separator 12 is in contact with the gas diffusion layer 112b. The anode separator 12 has a plurality of a plurality of groove-shaped anode gas flow channels 121 on the side in contact with the gas diffusion layer 112b for feeding anode gas to the anode electrode 112.

The cathode separator 13 is in contact with the gas diffusion layer 113b. The cathode separator 13 has a plurality of groove-shaped cathode gas flow channels 131 on the side in contact with the gas diffusion layer 113b for feeding the cathode gas to the cathode electrode 113.

The anode gas flowing in the anode gas flow channels 121 and the cathode gas flowing in the cathode gas flow channel 131 can flow parallel with each other in the same direction, or they can flow parallel with each other yet opposite directions from each other. In addition, they can also flow orthogonal to each other.

When the fuel cell 10 is used as a power source on a vehicle, hundreds of fuel cells 10 are stacked to form a fuel cell stack to meet the high power requirement. Here, a fuel cell system is formed for feeding the anode gas and the cathode gas to the fuel cell stack, and the electric power for driving the vehicle is output from the fuel cell stack.

Figure 2:
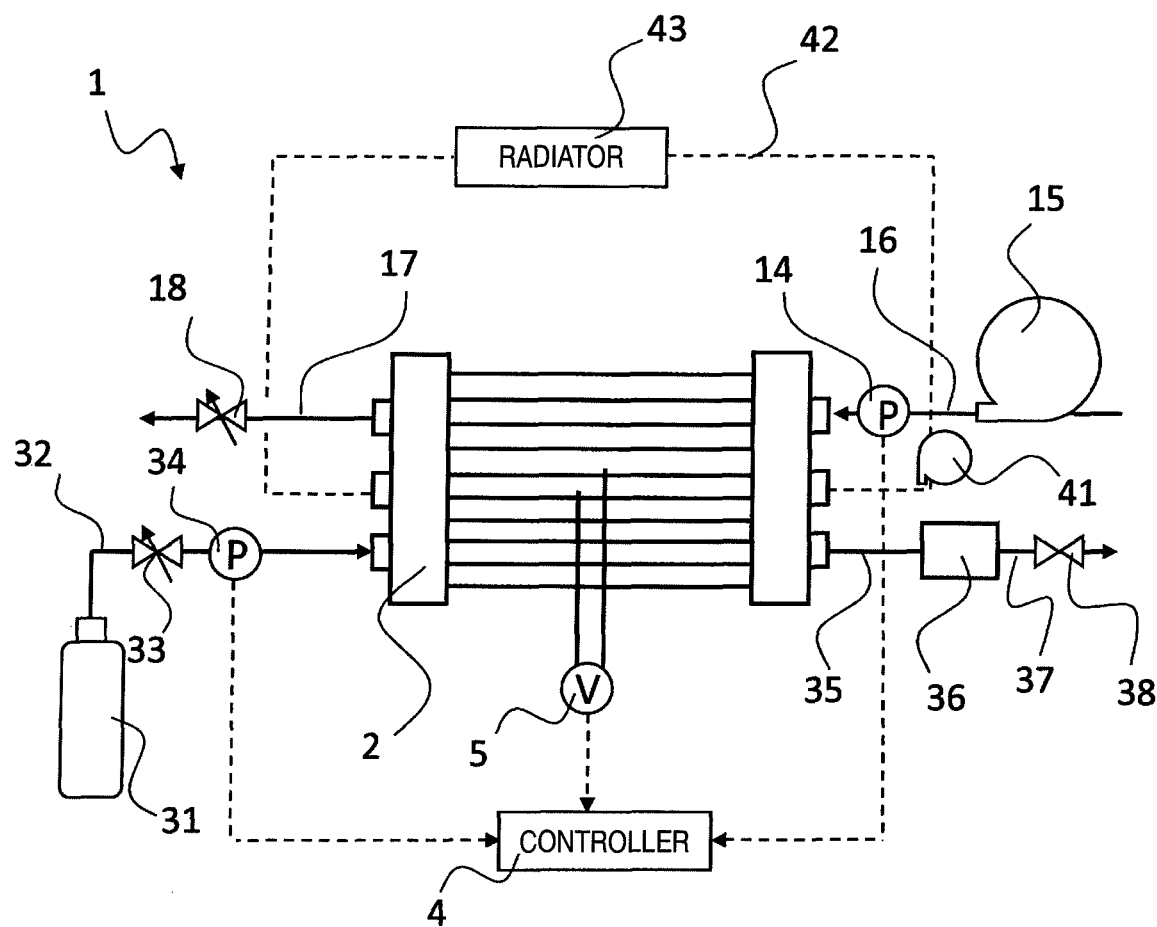
FIG. 2 is a schematic diagram illustrating the anode gas non-circulating-type fuel cell system in accordance with the first embodiment.

FIG. 2 is a schematic block diagram illustrating the configuration of an anode non-circulation type fuel cell system in accordance with the first embodiment. An anode non-circulation type fuel cell system supplies an anode gas (hydrogen gas) to the fuel cell stack without circulating the anode gas (hydrogen gas).

The fuel cell stack 2 is prepared by stacking a plurality (hundreds) of the fuel cells 10. As the anode gas and the cathode gas are fed to the fuel stack, the fuel stack generates the electric power needed for driving the vehicle (such as the electric power needed for driving the motor). According to the present embodiment, air is used as the cathode gas.

A high-pressure tank 31 is provided to store the high-pressure anode gas (hydrogen). The anode gas of the high-pressure tank 31 is fed via an anode gas feeding pipeline 32 (the fuel gas feeding flow channel) to the anode of the fuel cell stack 2. Here, instead of the high-pressure tank 31, hydrogen can be produced according to a modification reaction that uses alcohol, hydrocarbon, or the like as the raw feed material.

A pressure adjusting valve 33 is arranged in the anode gas feeding pipeline 32 for adjusting the feeding rate of the anode gas. The pressure adjusting valve 33 is, for example, an electromagnetic valve for continuous or stepwise adjustment of the opening degree. The opening degree of the pressure adjusting valve 33 is controlled by a controller 4. The pressure adjusting valve 33 constitutes an example of a control valve.

A pressure sensor 34 is arranged in the anode gas feeding pipeline 32 at a location downstream from the pressure adjusting valve 33. The pressure sensor 34 detects the pressure of the anode gas flowing in the anode gas feeding pipeline 32 at a location downstream from the pressure adjusting valve 33. In the present embodiment, the pressure of the anode gas (hereinafter referred to as the "anode pressure") detected with this pressure sensor 34 is a substitute for the pressure of the entire anode system that includes the anode gas flow channels 121 and a buffer tank 36 inside of the fuel cell stack.

An anode gas exhausting pipeline 35 has one end portion connected to the anode gas outlet hole of the fuel cell stack 2 and the other end portion connected to the upper portion of the buffer tank 36 (e.g., a buffer component). The anode gas exhausting pipeline 35 exhausts the excessive anode gas not used in the electrode reaction, a gas mixture of nitrogen and hydrogen, and other impurity gas (hereinafter to be referred to as "anode-off gas") cross-leaked from the cathode side to the anode gas flow channels 121.

The buffer tank 36 temporarily stores the anode-off gas flown through the anode gas exhausting pipeline 35. A portion of the steam in the anode-off gas is condensed in the buffer tank 36 to liquid that is then separated from the anode-off gas.

The purge path 37 has one end portion connected to the lower portion of the buffer tank 36. The other end portion of the purge path 37 is an open end. The anode-off gas and the liquid staying in the buffer tank 36 are then exhausted through the purge path 37 and from the open end to the outside air (ambient atmosphere).

A purge valve 38 is provided in the purge path 37. The purge valve 38 is an electromagnetic valve that continuously or stepwise adjusts the opening degree. The opening degree is adjusted under control by the controller 4. The amount of anode-off gas exhausted to the outside air through the purge path 37 from the buffer tank 36 is controlled by adjusting the opening of the purge valve 38 so that the anode gas concentration in the buffer tank 36 is kept within a prescribed range. The reason for this operation is as follows: if the anode gas concentration is too high in the buffer tank 36, the rate of the anode gas exhausted from the buffer tank 36 through the purge path 37 to the ambient atmosphere is increased, and creates a waste. On the other hand, if the concentration is too low, the fuel becomes insufficient to generate electric power, and the catalyst degrades.

The cathode gas (air) is fed from a compressor 15 via the feeding pipe 16 to the cathode of the fuel cell stack 2. It is possible to use an air feeding means such as a blower or the like instead of the compressor. A pressure sensor 14 is arranged in the feeding pipe 16 to detect the pressure of the cathode gas. The cathode gas exhausted from the cathode of the fuel cell stack 2 is released via the exhaust pipe 17 to the atmosphere. A pressure adjusting valve 18 is arranged in the exhaust pipe 17 for regulating the back pressure (the pressure in the cathode gas flow channel).

The cooling water is fed to the fuel cell stack 2 via a cooling water pipe 42 from a radiator 43. The temperature of the cooling water is increased by taking in the heat that was generated in the fuel cell stack 2. The cooling water is then fed via the cooling water pipe 42 to the radiator 43 where the cooling water is cooled. The cooling water is then recirculated back into the fuel cell stack 2. A cooling water pump 41 is arranged in the cooling water pipe 42 for circulating the water.

The controller 4 includes a microcomputer that comprises a Central Processing Unit (CPU), a Read Only Memory (ROM), a Random Access Memory (RAM) and an input/output interface (I/O interface).

The controller 4 receives various signals for indicating the operational status of the fuel cell system 1. In other words, various sensors detect various parameters of the operation state of the fuel cell system 1 and signals from these sensors are input to the controller 4. A pressure sensor 34 is provided to detect the anode pressure, and outputs a signal to the controller 4 for indicating the anode pressure. A pressure sensor 14 is provided to detect the cathode pressure, and outputs a signal to the controller 4 for indicating the cathode pressure. A voltage sensor 5 is provided to detect the voltage of the fuel cell stack 10, and outputs a signal to the controller 4 for indicating the voltage of the fuel cell stack 10.

Based on these input signals, the controller 4 executes a pulsation operation. In particular, the controller 4 periodically increases and decreases the anode pressure by periodically opening and closing the pressure adjusting valve 33. Also the controller 4 adjusts the opening degree of the purge valve 38 to regulate the flow rate of the anode-off gas exhausted from the buffer tank 36 and to maintain the anode gas concentration in the buffer tank 36 to be within a prescribed range.

The controller 4 also shuts down the power generation operation of the fuel cell stack 2 based on a shutdown command or instruction made to the fuel cells stack 2 to shut down the power generation operation and restarts the power generation operation of the fuel cell stack 2 when there is a command to restart the power generation operation after being shut down.

In addition, as to be explained later, the controller 4 estimates the anode gas concentration at the location in the power generation region of the fuel cell stack 2 where the anode gas concentration is locally lower. The controller then determines whether it is possible to carry out the process for the shutdown of the power generation operation of the fuel cell stack 2 based on the anode gas concentration that was obtained (the estimated anode gas concentration) as will be described later.

In the case of an anode gas non-circulating-type fuel cell system 1, the anode gas is continually fed from the high pressure tank 31 to the fuel cell stack 2 while the pressure adjusting valve 33 is opened as is. As a result, the anode-off gas containing the unused anode gas exhausted from the fuel cell stack 2 is exhausted from the buffer tank 36 to the outside air through the purge path 37. This results in waste.

Therefore, according to the present embodiment, the pressure adjusting valve 33 is periodically opened and closed by the controller 4, so that the anode pressure is periodically increased and decreased to perform the pulsation operation. When the pulsation operation is carried out, the anode-off gas staying in the buffer tank 36 flows back in the fuel cell stack 2 when the anode pressure decreases. As a result, it is possible to reuse the anode gas in the anode-off gas, so that decreasing the anode gas quantity exhausted to the ambient atmosphere is possible. As a result, waste can be prevented.

Figure 3:
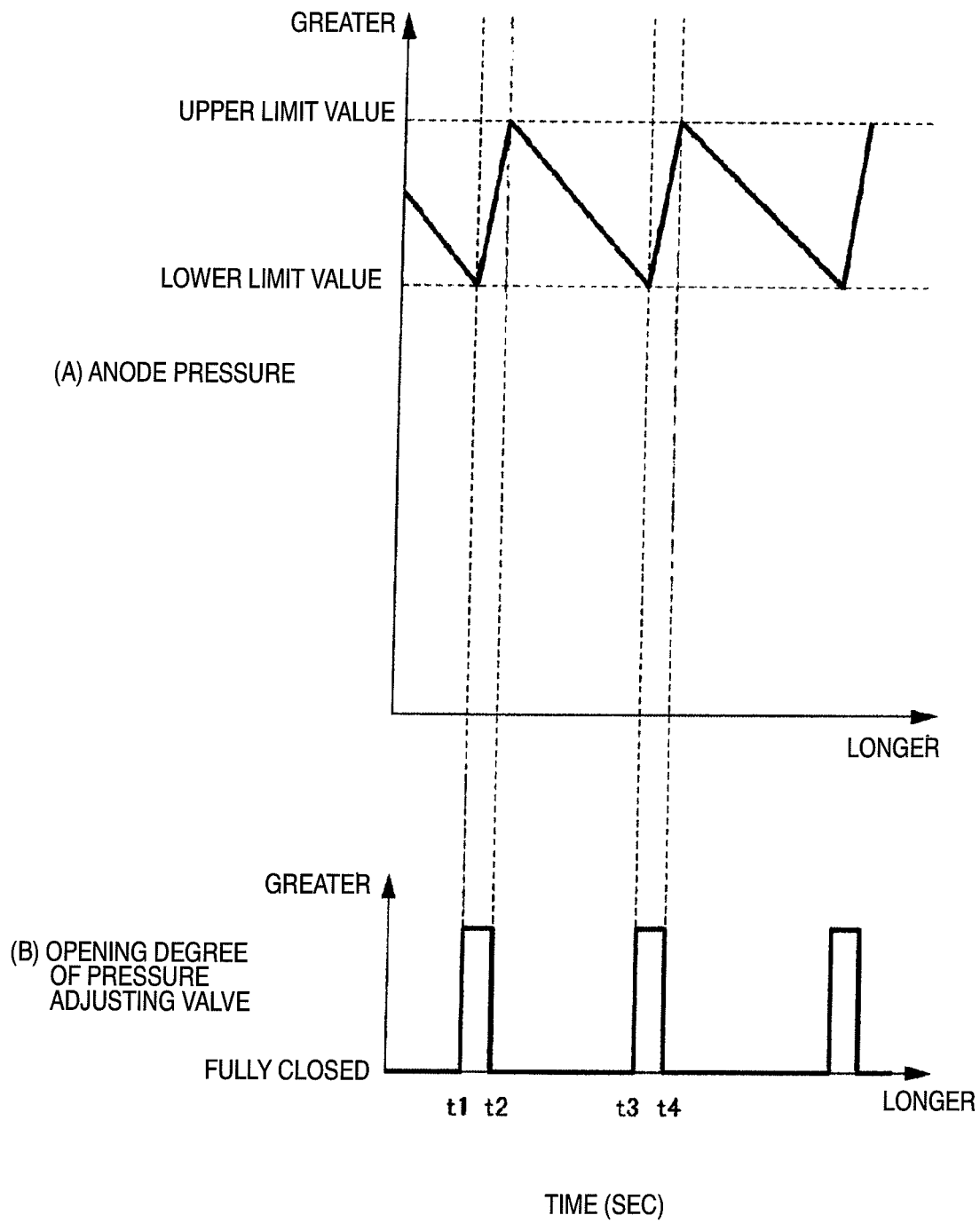
FIG. 3 is a time chart illustrating a pulsation operation when the operational status of a fuel cell system is in a steady state operation.

FIG. 3 includes diagrams illustrating the pulsation operation when the operation state of the fuel cell system 1 is in steady state.

As shown in the upper portion (A) of FIG. 3, the controller 4 computes the target output of the fuel cell stack 2 based on the operation state of the fuel cell system 1 (the load of the fuel cell stack). The controller 4 sets the upper limit value and the lower limit value of the anode pressure corresponding to the target output. Then, the anode pressure is increased and decreased periodically between the set upper limit value and the lower limit value for the anode pressure.

More specifically, when the anode pressure reaches the lower limit value at time t1, as shown in the lower portion (B) of FIG. 3, the pressure adjusting valve 33 is opened to the opening degree which at least allows the anode pressure to be increased to the upper limit value. In this state, the anode gas is fed from the high pressure tank 31 to the fuel cell stack 2, and the anode gas is exhausted from the buffer tank 36.

If the anode pressure reaches the upper limit value at time t2, as shown in the lower portion (B) of FIG. 3, the pressure adjusting valve 33 is fully closed, so that supply of the anode gas from the high-pressure tank 31 to the fuel cell stack 2 is shut down. As a result, due to the aforementioned electrode reaction of Equation (1), the anode gas left in the anode gas flow channels 121 inside of the fuel cell stack is used up over time, so that the anode pressure decreases corresponding to the consumption of the anode gas.

As the residual anode gas left in the anode gas flow channels 121 is consumed, the pressure in the buffer tank 36 is temporarily higher than the pressure in the anode gas flow channels 121, so that the anode-off gas flows back from the buffer tank 36 to the anode gas flow channels 121. As a result, the residual anode gas left in the anode gas flow channels 121 and the anode gas in the anode-off gas back flown to the anode gas flow channels 121 are consumed over time, and the anode pressure further decreases.

When the anode pressure reaches the lower limit value at time t3, the pressure adjusting valve 33 is opened in the same manner as at time t1. Then, when the anode pressure reaches the upper limit value again at time t4, the pressure adjusting valve 33 is fully closed.

Here, when carrying out this type of pulsation operation, at the time that the operational status of the fuel cell system 1 changes, specifically, at the time of a transient operation for decreasing the output of the fuel cells stack 2 to the target output by decreasing the target output of the fuel cell stack 2 (hereinafter referred to as the time of the down transient operation), a section of the anode gas flow channels 121 is created where the anode gas concentration is locally lower than the other sections inside of the anode gas flow channels 121. Below, this will be explained by referring to FIG. 4 and FIG. 5.

Figure 4:
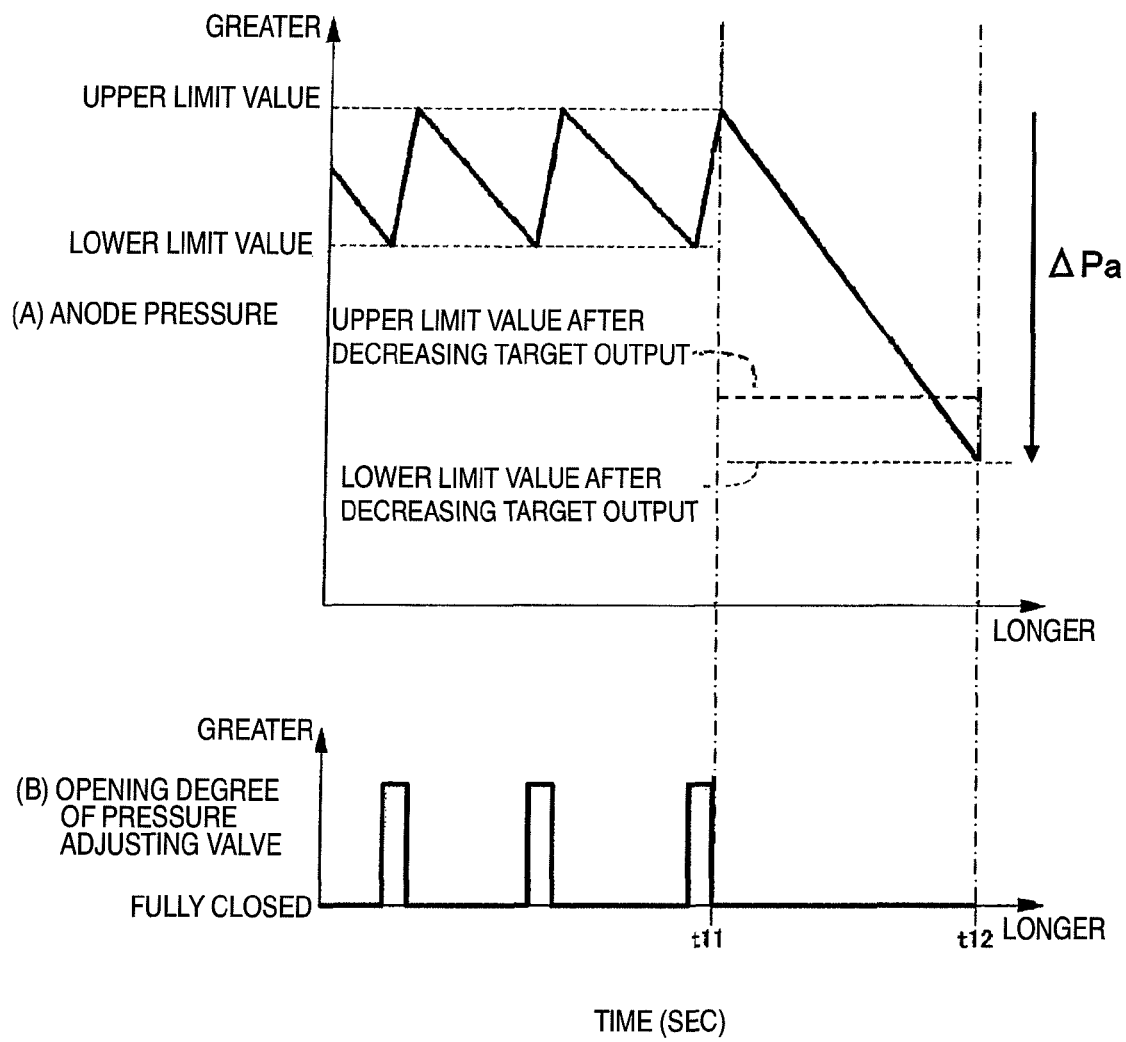
FIG. 4 is a time chart illustrating the change in the anode pressure in the case where the anode pressure is decreased to a lower limit pressure by completely closing the pressure adjusting valve at the time of a down transient operation.

FIG. 4 is a time chart illustrating a variation in the anode pressure when the pressure adjusting valve 33 is fully closed and the anode pressure is decreased to the lower limit pressure in the down transition operation.

At time t11, when, for example, the target output decreases for the fuel cell stack 2 due to a decrease in the accelerator pedal depression amount, the upper limit value and the lower limit pressure of the anode pressure are set to correspond to the decreased target output as shown in the upper portion (A) of FIG. 4. Since the amount of fuel consumed at a time of high output is higher, the anode pressure is set higher than at a time of low output.

In this case, as shown in portions (A) and (B) of FIG. 4, at time t11, the pressure adjusting valve 33 is fully closed, so that the anode pressure is decreased to the lower limit value (time t12), and the section is created inside of the anode gas flow channels 121 where the anode gas concentration is locally lower than the other sections inside of the anode gas flow channels 121. The reason for this feature will be explained with reference to FIG. 5.

Figure 5:
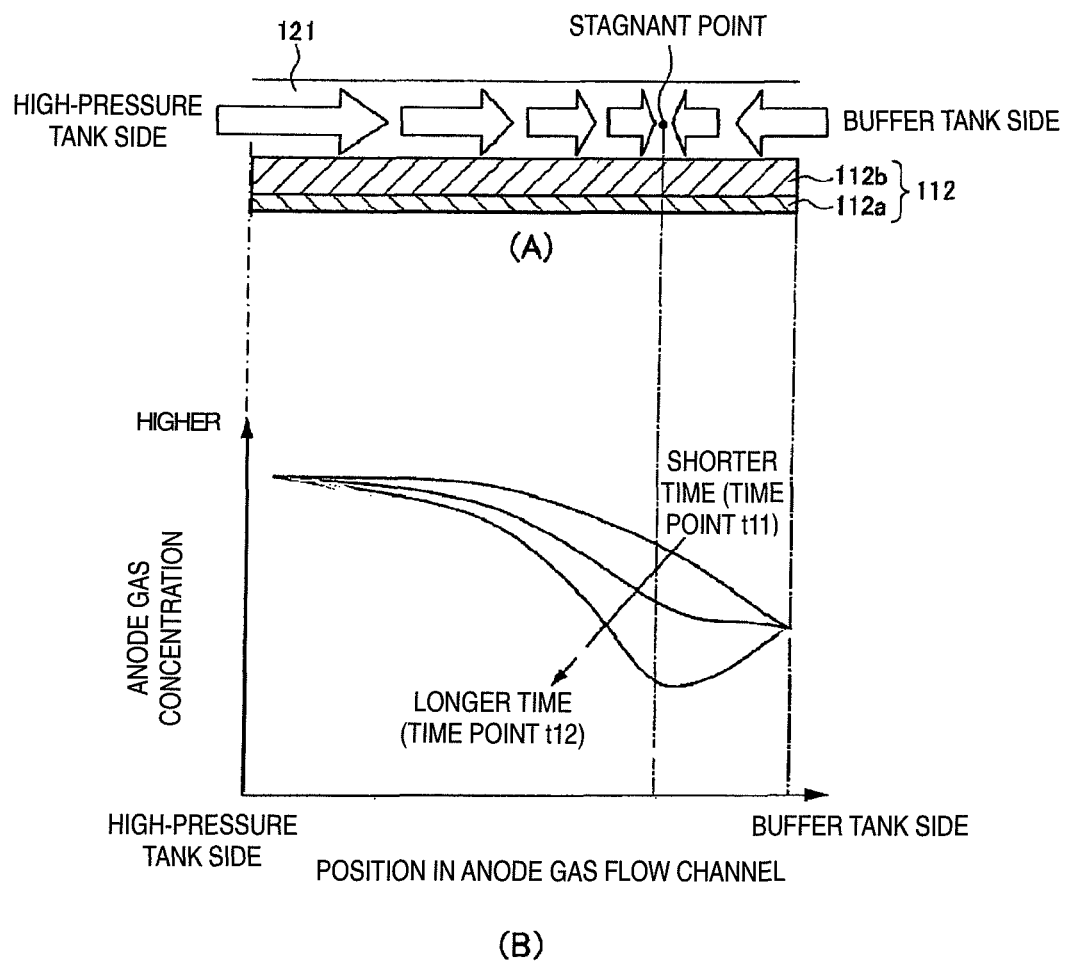
FIG. 5 is a diagram illustrating the cause for the generation of the portion in the anode gas flow channel with anode gas concentration locally lower than the remaining portions of the anode gas flow channel.

FIG. 5 is a diagram explaining the reason for creating the section inside of the anode gas flow channels 121 where the anode gas concentration is locally lower than in the other sections on the inside of the anode gas flow channels. The portion (A) of FIG. 5 is a diagram illustrating the flow of the anode gas and the anode-off gas in the anode gas flow channels 121 when the pressure adjusting valve 33 is fully closed in the down transition operation. The portion (B) of FIG. 5 is a diagram illustrating the anode gas concentration distribution over time in the anode gas flow channels 121 when the pressure adjusting valve 33 is fully closed in the down transition operation.

As shown in the portion (A) of FIG. 5, when the pressure adjusting valve 33 is fully closed, the residual anode gas left in the anode gas flow channels 121 flows due to inertia to the side of the buffer tank 36. Here, as the residual anode gas left in the anode gas flow channels 121 is consumed, the pressure in the buffer tank 36 temporarily exceeds that in the anode gas flow channels 121. Consequently, the anode-off gas flows back from the side of the buffer tank 36 to the anode gas flow channels 121.

As a result, at the merging section of the anode gas flowing in the anode gas flow channels 121 toward the side of the buffer tank 36 and the backflow of the anode gas from the side of the buffer tank 36 to the anode gas flow channels 121, a stagnant point where the gas flow rate becomes zero takes place.

When this type of stagnation point is created inside of the anode gas flow channels 121, nitrogen inside of the anode-off gas that had not been used in the electrode reaction of Equation (1) accumulates at the vicinity of the stagnation point with the lapse in time. As a result, the nitrogen concentration at the vicinity of the stagnation point is made higher than in other sections with the lapse in time, and the anode gas concentration at the vicinity of the stagnation point is made lower than in other sections with the lapse in time as shown in the portion (B) of FIG. 5. In the following explanation, as needed, the anode gas concentration at this stagnant point will be referred to as "the lowest anode gas concentration in the flow channel".

As explained above, after the down transition operation, a stagnant point exists inside of the anode gas flow channels 121, and a section where the anode gas concentration is locally lower than in the other sections is created inside of the anode gas flow channels 121. The deterioration of the cathode catalyst that was described above is made notable in this section where the anode gas concentration is lower than in the other sections.

In the fuel cell system of the first embodiment, the lowest anode gas concentration Cmin in the flow channels is estimated by the controller 4 based on a control state of the anode gas at the time of the shutdown command. The controller 4 also determines the condition exists for the execution of the shutdown/restart operation of the fuel cell stack 2 based on the lowest anode gas concentration Cmin that was estimated in the flow channels (hereinafter to be referred to as the estimated lowest anode gas concentration Cmin). The condition for executing the shutdown/restart operation of the fuel cell stack 2 includes a control condition during the power generation shutdown of the fuel cell stack 2 and a control condition after the restart operation.

Figure 6:
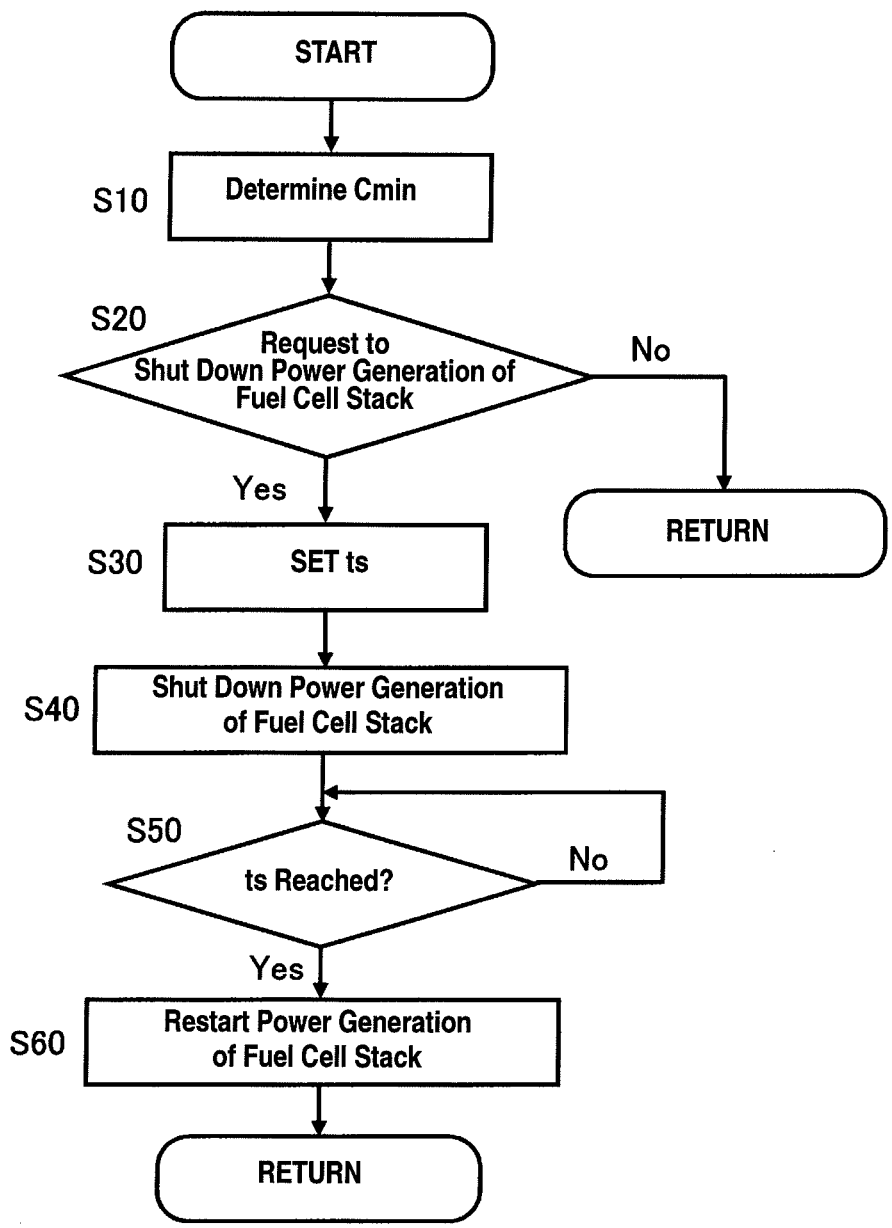
FIG. 6 is a flow chart illustrating a process executed by the controller for setting the condition for executing the shutdown/restart operation of the fuel cell stack carried out by the fuel cell system in accordance with the first embodiment.

FIG. 6 is a flow chart illustrating the control process executed by the controller 4 for setting the condition for executing the shutdown/restart operation of the fuel cell stack 2 that is carried out by the fuel cell system 1 in the first embodiment. The process starting from step S10 is carried out by the controller 4.

In step S10, the lowest anode gas concentration Cmin in the flow channels is estimated. The method for estimating the lowest anode gas concentration Cmin in the flow channels will be explained with reference to FIG. 7.

Figure 7:
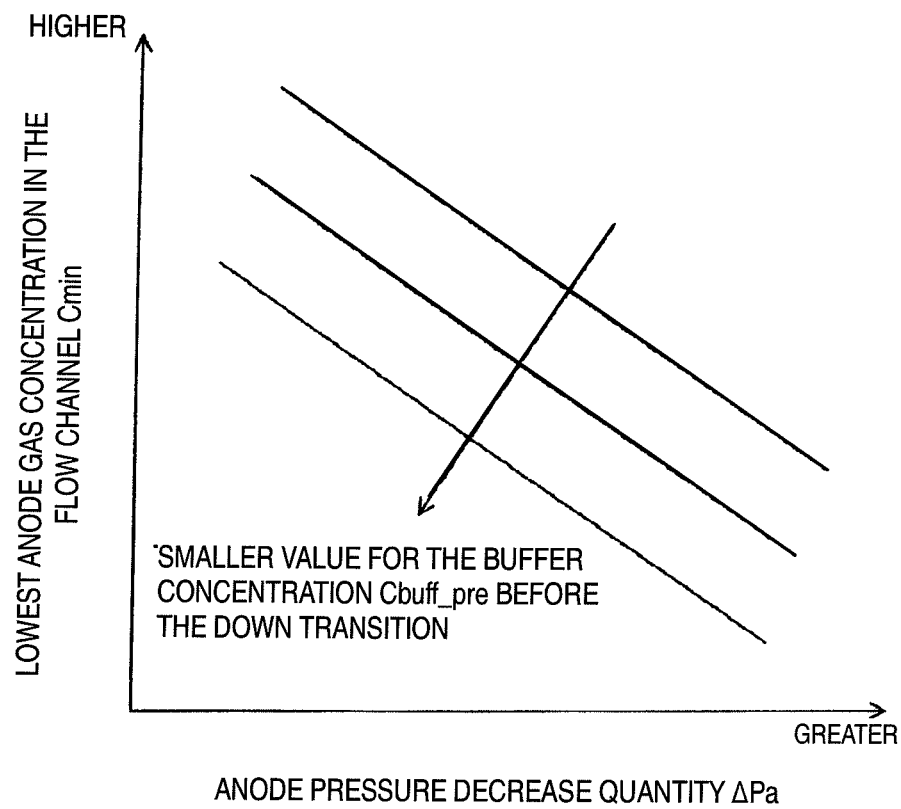
FIG. 7 is a map for calculating an estimated lowest anode gas concentration in the flow channel based on the amount of the anode pressure drop and the pre-lowering transition buffer concentration.

Referring to FIG. 7, a map is illustrated for computing the estimated lowest anode gas concentration Cmin in the flow channels based on the anode pressure decrease quantity ΔPa and the buffer concentration Cbuff_pre before the down transition as the control state of the anode gas at the time of the shutdown command. The anode pressure decrease quantity ΔPa is the differential pressure between the anode pressure right before the down transition operation and the current anode pressure. The buffer concentration Cbuff_pre before the down transition is the concentration of the anode gas in the buffer tank 36 right before the down transition operation, and this buffer concentration is detected by a sensor not shown in the Figures.

As shown in FIG. 6, the estimated lowest anode gas concentration Cmin in the down transition operation becomes lower when the anode pressure decrease quantity ΔPa becomes higher or when the buffer concentration Cbuff_pre before the down transition becomes lower.

The controller 4 estimates the anode pressure decrease quantity ΔPa and the buffer concentration Cbuff_pre before the down transition. The controller 4 then estimates the lowest anode gas concentration Cmin in the flow channels based on the map shown in FIG. 7 and the estimated anode pressure decrease quantity ΔPa and the buffer concentration Cbuff_pre before the down transition.

In step S20, a determination is made regarding whether or not there was a request to shut down the power generation in the fuel cell stack 2. For example, when idle stop is carried out by a vehicle provided with an idle stop function, a power generation shutdown request is output to the fuel cell stack 2. When a determination is made that there is no request to shut down the power generation in the fuel cell stack 2, the process returns to step S10. If there is a request to shut down the power generation, the process goes on to step S30.

In step S30, based on the lowest anode gas concentration Cmin in the flow channels estimated in step S10, the power generation shutdown time is of the fuel cell stack 2 is set. In the following, an explanation will be made on the method for setting the power generation shutdown time ts of the fuel cell stack 2 based on the estimated lowest anode gas concentration Cmin in the flow channels and the system tolerable quantity in the decrease of the output of the fuel cell stack 2. An explanation will also be made on the method for setting the power generation shutdown time ts of the fuel cell stack 2 based on the estimated lowest anode gas concentration Cmin in the flow channels and the tolerable quantity of the degradation in the cathode catalyst during the power generation shutdown of the fuel cell stack 2.

Figure 8:
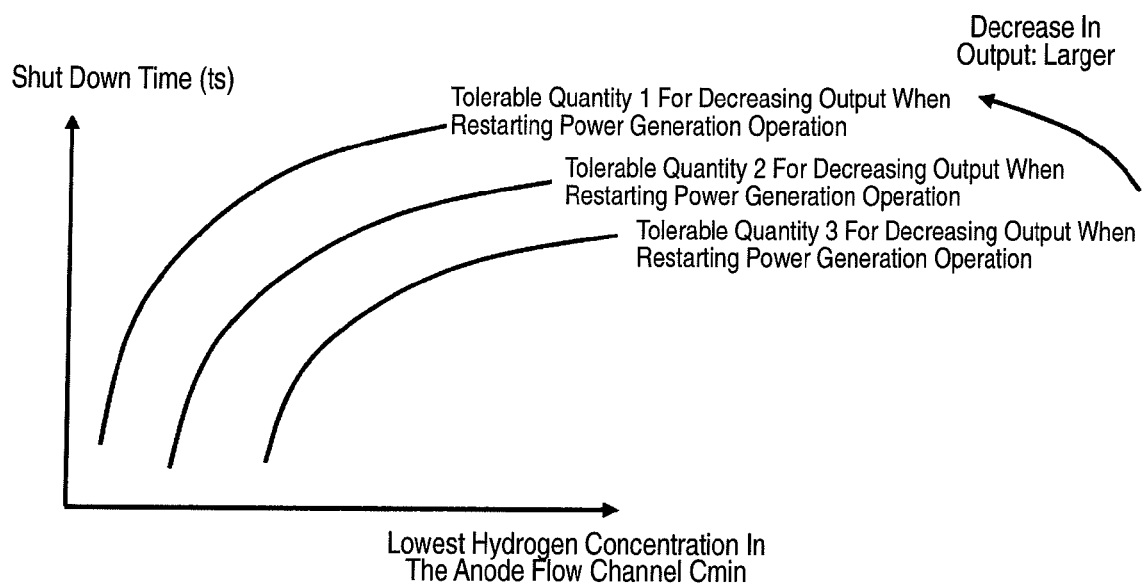
FIG. 8 is a graph conceptually illustrating an example of map data representing the relationship between the estimated lowest anode gas concentration in the flow channel, the tolerable output decrease quantity of the fuel cell stack in the restart operation, and the power generation shutdown time of the fuel cell stack.

FIG. 8 shows an example of the map illustrating the relationship between the lowest anode gas concentration Cmin in the flow channel, the system tolerable quantity in the decrease of the output of the fuel cell stack 2 when the power generation is restarted, and the power generation shutdown time ts of the fuel cell stack 2. As shown in FIG. 8, the power generation shutdown time ts of the fuel cell stack 2 is shorter when the lowest anode gas concentration Cmin in the flow channels is lower or when the tolerable output decrease quantity of the fuel cell stack 2 is smaller.

For example, the tolerable output decrease quantity of the fuel cell stack 2 when the power generation is restarted can be determined based on the vehicle speed when the power generation is restarted. That is, when the vehicle speed is higher, the tolerable output decrease quantity of the fuel cell stack 2 when the power generation operation is restarted is smaller. On the contrary, when the vehicle speed is lower, the tolerable output decrease quantity of the fuel cell stack 2 when the power generation is restarted is higher.

Figure 9:
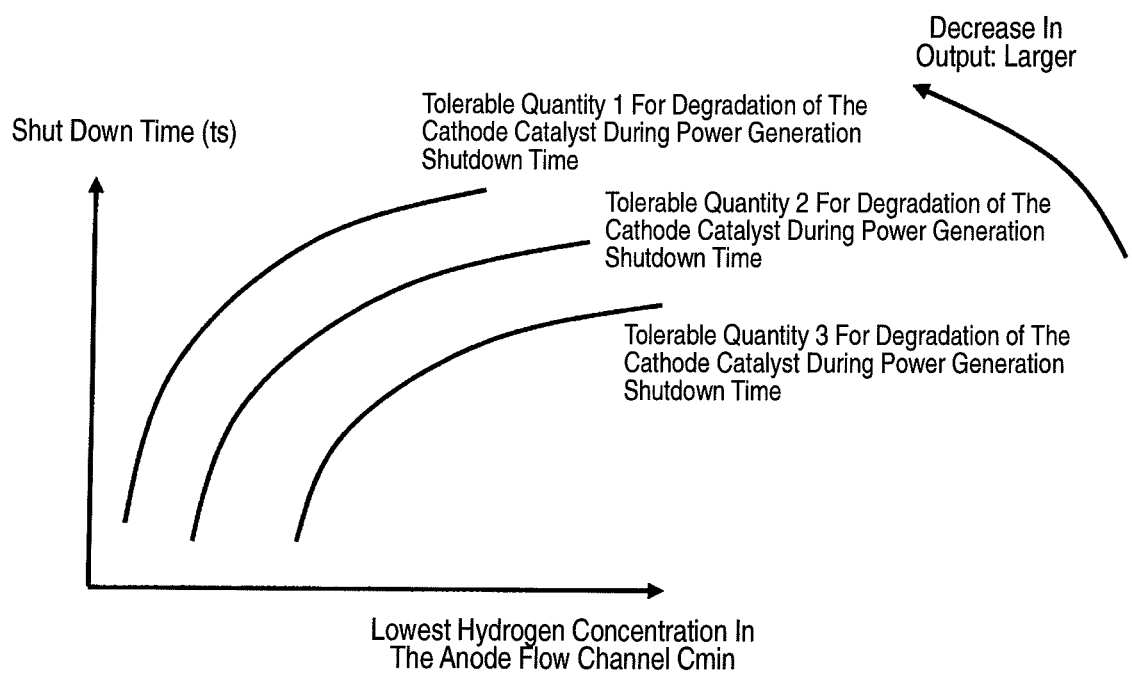
FIG. 9 is a graph conceptually illustrating an example of map data representing the relationship between the estimated lowest anode gas concentration in the flow channel and the tolerable degradation quantity of the cathode catalyst layer during the operation shut-down time of the fuel cell stack.

FIG. 9 is a diagram illustrating an example of the map indicating the relationship between the lowest anode gas concentration Cmin in the flow channel, the tolerable degradation quantity of the cathode catalyst during the power generation shutdown of the fuel cell stack 2, and the power generation shutdown time ts of the fuel cell stack 2. As shown in FIG. 9, the power generation shutdown time ts of the fuel cell stack 2 is shorter when the lowest anode gas concentration Cmin in the flow channels is lower or when the tolerable degradation quantity of the cathode catalyst during the power generation shutdown of the fuel cell stack 2 is smaller. Here, the tolerable degradation quantity of the cathode catalyst during the power generation shutdown of the fuel cell stack 2 can be determined from, for example, the target operation time of the fuel cell stack 2.

In step S40 of the flow chart shown in FIG. 6, the power generation of the fuel cell stack 2 is shut down. As the power generation is shut down, the measurement of the shutdown time is started.

In step S50, a determination is made regarding whether the power generation shutdown time has passed the power generation shutdown time ts set in step S30. If a determination has been made that the power generation shutdown time has not reached the power generation shutdown time ts, the operation stands by as is. On the other hand, if a determination is made that the power generation shut down time ts has been reached, the operation goes to step S60.

In step S60, the power generation operation of the fuel cell stack 2 is restarted.

As explained above, according the fuel cell in the first embodiment, in the anode gas non-circulating-type fuel cell system, the anode gas concentration is estimated at the position where the anode gas concentration is locally lower in the power generation region of the fuel cell. According to the estimated anode gas concentration, the condition is set for the execution of the shutdown/restart operation of the fuel cell. As a result, in the anode gas non-circulating-type fuel cell system, in consideration of the anode gas concentration at the position where the anode gas concentration is locally lower in the power generation region, it is possible to make an appropriate setting for the condition for executing the shutdown/restart operation of the fuel cell. Consequently, preventing the degradation in the cathode catalyst during the power generation shutdown time is possible. Also, preventing the degradation in the output responsiveness after the restart of the operation is possible. Here, the degradation in the catalyst takes place due to the generation of a hydrogen front due to the cathode gas cross-leaked from the cathode to the anode during the power generation shutdown time. More specifically, in the cathode, carbon that carries platinum as the electrical catalyst reacts with the water generated in the electrochemical reaction so that the carbon is converted to carbon dioxide and so that the platinum carried on the carbon is eluted and the catalyst function degrades.

In particular, the lower the anode gas concentration at the position where the anode gas concentration is locally lower, the shorter the power generation shutdown time of the fuel cell is set. Consequently, it is possible to prevent the degradation in the cathode catalyst during the power generation shutdown time, and preventing the degradation in the output responsiveness after the restart of the operation is possible.

Some vehicles have a battery (a secondary battery) in addition to the fuel cell stack 2 as an electric power supply for providing a drive force. For such a vehicle, when the power generation operation is restarted for the fuel cell in the shutdown state, the output of the secondary battery is used as an auxiliary output to supplement the output of the fuel cell stack 2 so that the output responsiveness is improved.

In the fuel cell system in the second embodiment, corresponding to the estimated lowest anode gas concentration Cmin in the flow channels, the output of the battery for supplementing the output of the fuel cell when the power generation operation of the fuel cell is restarted is increased.

Figure 10:
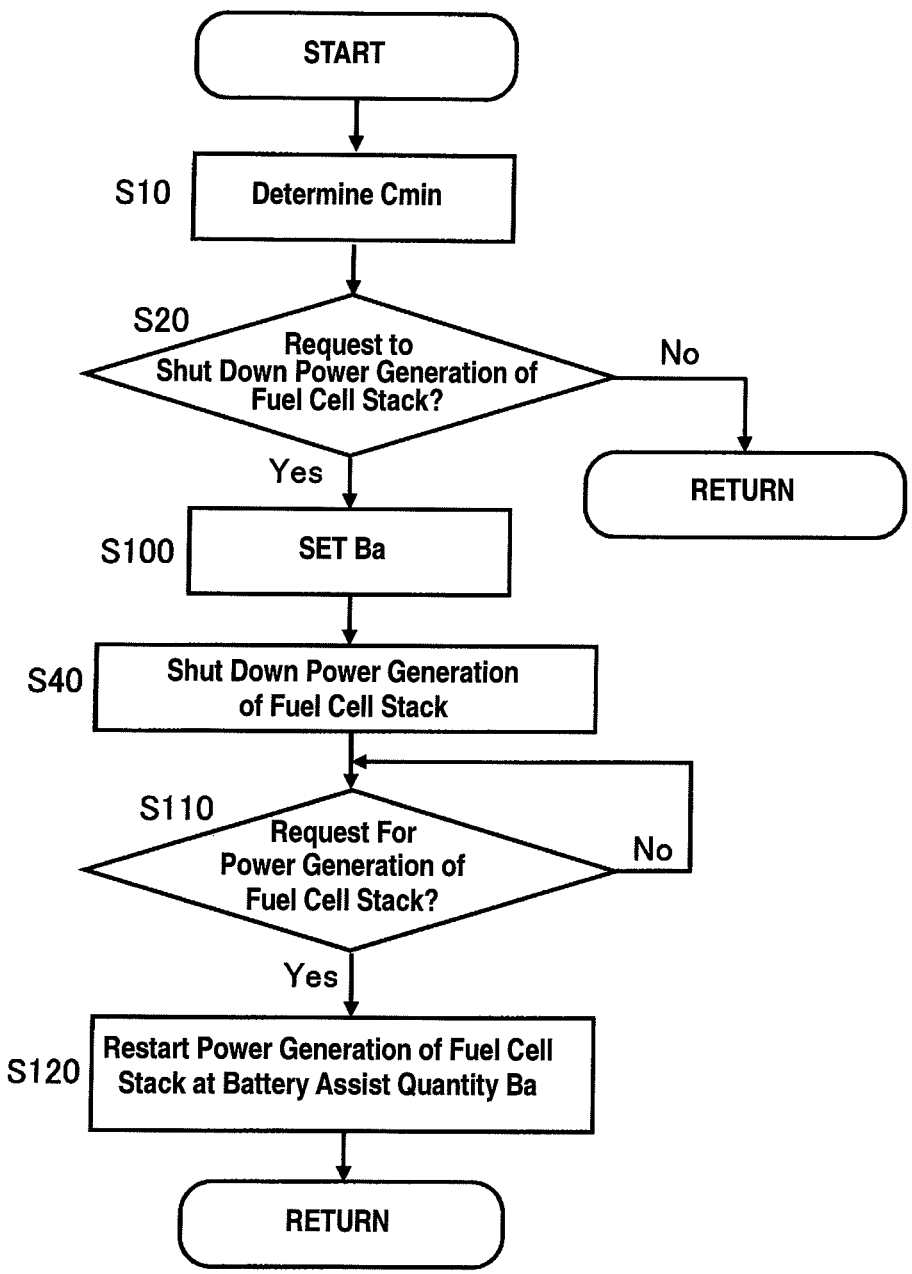
FIG. 10 is a flow chart illustrating a process executed by the controller setting the condition for executing the shutdown/restart operation of the fuel cell stack by the fuel cell system in accordance with the second embodiment.

FIG. 10 is a flow chart illustrating the control process executed by the controller 4 for setting of the condition for executing the shutdown/restart operation of the fuel cell stack 2 carried out by the fuel cell system 1 in the second embodiment. The same reference numerals as those previously used to indicate the steps of the operation in the flow chart shown in FIG. 6 are used here, so that they will not be explained in detail again.

In step S100 after the determination result is YES in step S20, based on the lowest anode gas concentration Cmin in the flow channels estimated in step S10, the battery assisting quantity Ba is set when the power generation operation of the fuel cell stack 2 is restarted from the shutdown state.

Figure 11:
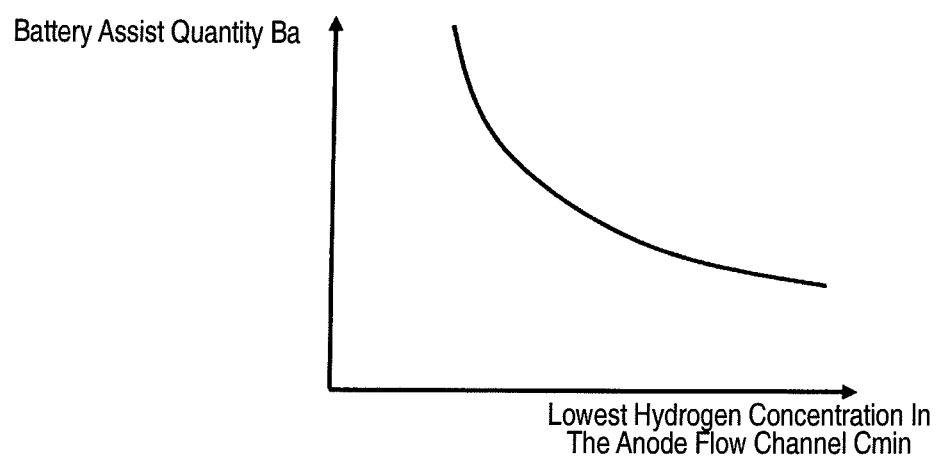
FIG. 11 is a graph conceptually illustrating an example of map data representing the relationship between the estimated lowest anode gas concentration in the flow channel and the battery assisting quantity.

FIG. 11 is a diagram illustrating an example of the map indicating the relationship between the lowest anode gas concentration Cmin in the flow channels and the battery assisting quantity Ba. Here, the relationship between the lowest anode gas concentration Cmin in the flow channels and the quantity of the decrease in the output of the fuel cell stack 2 when the power generation operation is restarted is determined by experiment beforehand. Also the quantity of the decrease in the output of the fuel cell stack 2 is set as the battery assisting quantity Ba when the power generation operation is restarted. Based on the relationship between the lowest anode gas concentration Cmin in the flow channels and the quantity of the decrease in the output of the fuel cell stack 2 when the power generation operation is restarted, as shown in FIG. 11, as the lowest anode gas concentration Cmin in the flow channels becomes lower, the battery assisting quantity Ba is set higher. In addition, the battery assisting quantity Ba may also be set at a value different from the quantity of the decrease in the output of the fuel cell stack 2 when the power generation operation is restarted.

In step S110 in the flow chart shown in FIG. 10, a determination is made regarding whether there is a request for starting the power generation of the fuel cell stack 2. When a determination is made that there is no request for starting the power generation, the process continuously repeats step S110. On the other hand, when a determination is made that there is a request for starting the power generation, the process goes to step S120.

In step S120, the power generation operation of the fuel cell stack 2 is restarted, and, at the same time, the battery assisting quantity Ba set in step S100 is fed to the load from the battery. That is, a decrease in the output of the fuel cell stack 2 when the power generation operation is restarted is supplemented by the battery assisting quantity Ba from the battery, so that the degradation in the overall output responsiveness of the system can be prevented.

According to the fuel cell system in the second embodiment as explained above, the lower the anode gas concentration at the position where the anode gas concentration is locally lower, the greater the battery assisting quantity from the battery when the power generation operation of the fuel cell is restarted, so that the degradation in the output responsiveness of the overall system can be prevented.

Figure 12:
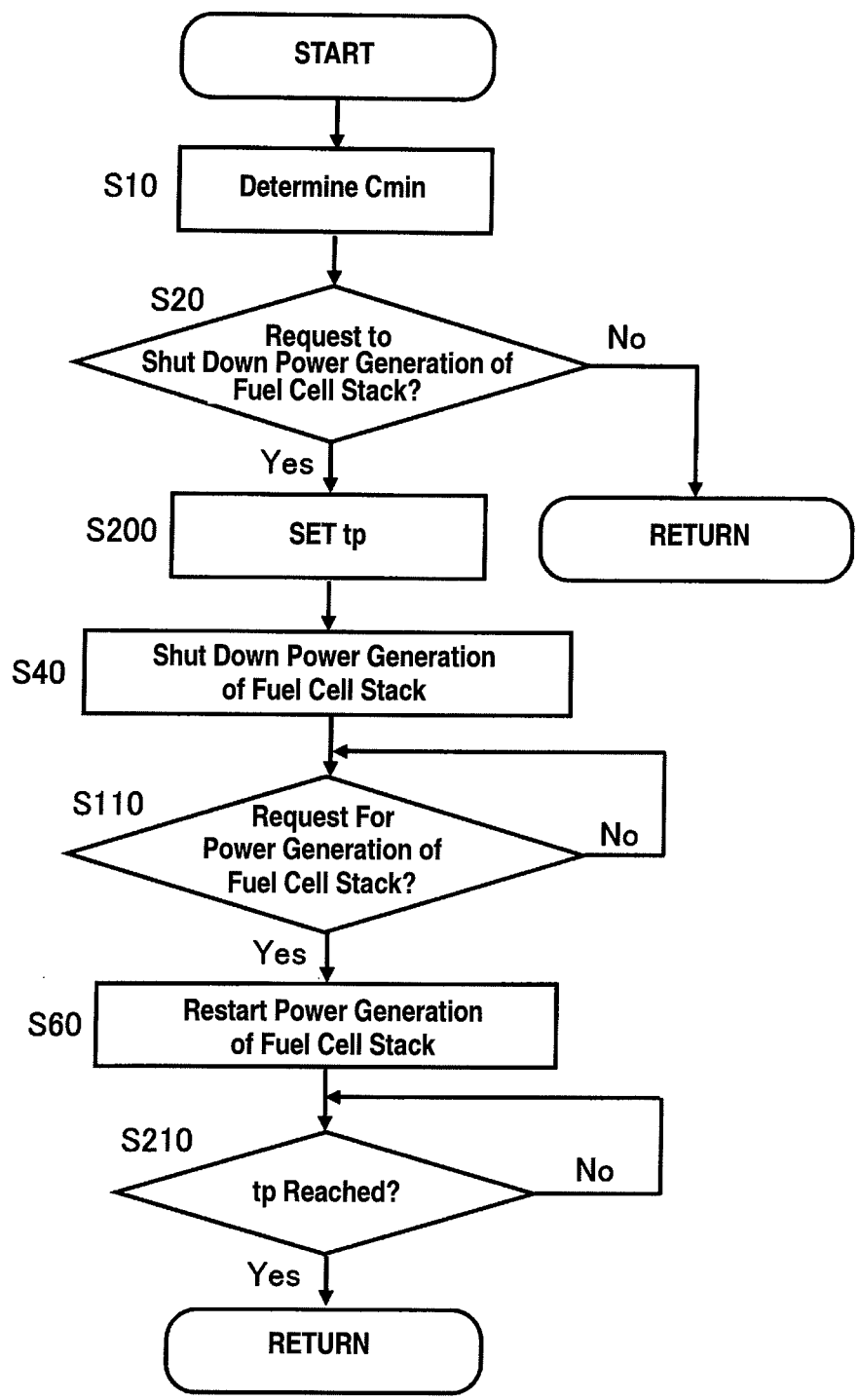
FIG. 12 is a flow chart illustrating a process executed by the controller for setting the condition for executing the shutdown/restart operation of the fuel cell stack by the fuel cell system in accordance with the third embodiment.

FIG. 12 is a flow chart illustrating the control process executed by the controller 4 for setting the condition for executing the shutdown/restart operation of the fuel cell stack 2 by the fuel cell system in the third embodiment. The same reference numerals as those used in the steps of the operation of the process shown in the flow chart of FIG. 6 are used, so that they will not be explained in detail again.

In step S200 that is reached when the result of the determination in step S20 is YES, based on the lowest anode gas concentration Cmin in the flow channels estimated in step S10, the re-shutdown prohibition time tp until the power generation operation is shut down again is set.

Figure 13:
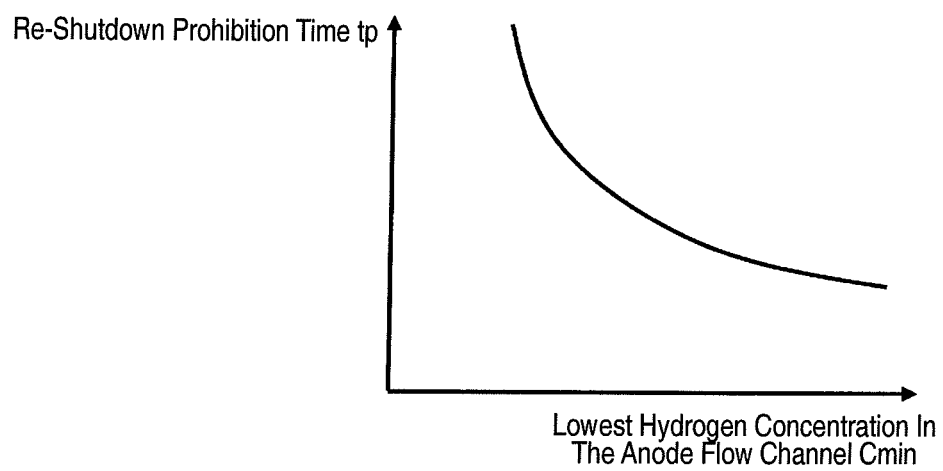
FIG. 13 is a graph conceptually illustrating an example of map data representing the relationship between the estimated lowest anode gas concentration in the flow channel and the re-shutdown prohibition time.

FIG. 13 is a diagram illustrating an example of the map indicating the relationship between the estimated lowest anode gas concentration Cmin in the flow channels and the re-shutdown prohibition time tp.

When the vehicle is in the idle stop mode, as the power generation operation of the fuel cell stack 2 is shut down, under the influence of the nitrogen and oxygen cross-leaked from the cathode to the anode, the lowest concentration of the anode gas in the flow channel decreases. When the idle stop (the shutdown of the power generation operation of the fuel cell stack 2) is carried out repeatedly, the lowest concentration of the anode gas in the flow chart gradually decreases. Consequently, the relationship between the lowest anode gas concentration Cmin in the flow channels and the time needed for the lowest anode gas concentration Cmin in the flow channels after the recovery from the idle stop (the restart of the power generation operation of the fuel cell stack 2) to reach a prescribed concentration level is determined by experiment beforehand. Here, the time needed for the lowest anode gas concentration Cmin in the flow channels to increase to the prescribed concentration level is taken as the re-shutdown prohibition time tp until shutdown again of the power generation operation of the fuel cell stack 2. As a result, it is possible to prevent a continuous decrease in the lowest anode gas concentration Cmin in the flow channels due to the repeated shutdown of the power generation operation of the fuel cell stack 2.

In step S210 that is reached after step S60 in the flow chart shown in FIG. 12, a determination is made regarding whether the re-shutdown prohibition time tp set in step S200 is reached. When a determination has been made that the re-shutdown prohibition time tp is not reached, the operation stands by in step S60. On the other hand, if a determination has been made that the re-shutdown prohibition time tp has reached, the process returns to step S10. As a result, if the re-shutdown prohibition time tp has not been reached, it is impossible to shut down the power generation operation of the fuel cell stack 2.

According to the fuel cell system in the third embodiment explained above, the lower the anode gas concentration at the position where the anode gas concentration is locally lower, the longer the re-shutdown prohibition time after the restart of the power generation operation of the fuel cell until shutdown again is set. As a result, it is possible to prevent a decrease in the anode gas concentration during the shutdown of the power generation operation. Consequently, suppressing the degradation in the cathode catalyst during the shutdown of the power generation operation is possible, and preventing the degradation in the output responsiveness after the restart of the operation is possible.

Figure 14:
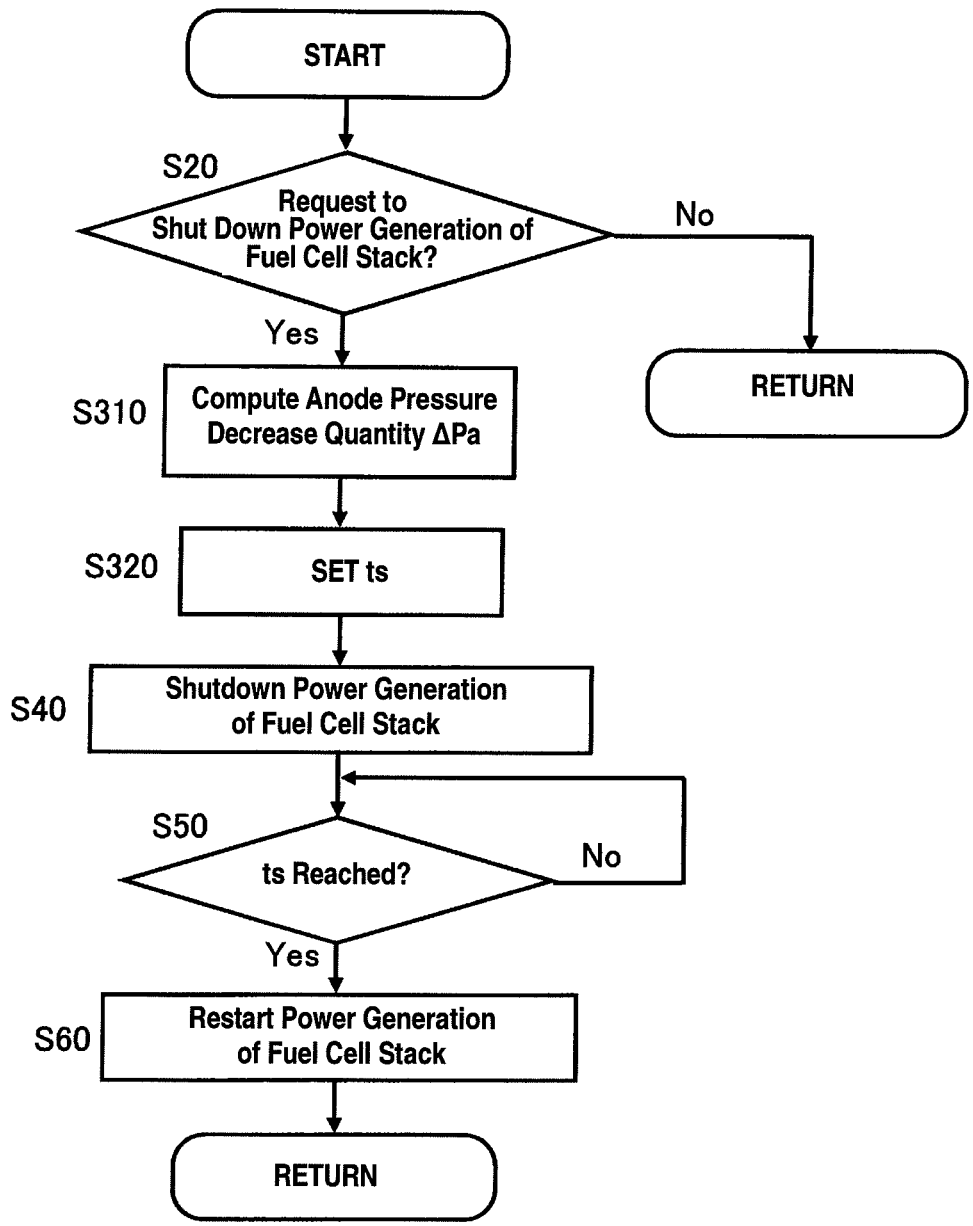
FIG. 14 is a flow chart illustrating a process executed by the controller for setting the condition for executing the shutdown/restart operation of the fuel cell stack by the fuel cell system in accordance with the fourth embodiment.

FIG. 14 is a flow chart illustrating the control process executed by the controller 4 for setting the condition for executing the shutdown/restart operation of the fuel cell stack 2 by the fuel cell system in the fourth embodiment. The same reference numerals as those used for the steps of the operation of the process in the flow chart shown in FIG. 6 are used, so that they will not be explained in detail again.

In step S20, a determination is made regarding whether there is a request to shut down the power generation of the fuel cell stack 2. If there is no such request for shutdown, the process returns to step S20. If there is a request for shut down, the process goes to step S310.

In step S310, the anode pressure decrease quantity $\Delta Pa$ occurring right before this step is computed. The anode pressure decrease quantity $\Delta Pa$ occurring right before the step is the differential pressure between the anode pressure right before entering the down transition operation and the current anode pressure.

In step S320, based on the anode pressure decrease quantity $\Delta Pa$ computed in step S310, the power generation shut down time ts of the fuel cell stack 2 is set. In the following, the method for computing the power generation shutdown time ts of the fuel cell stack 2 based on the anode pressure decrease quantity $\Delta Pa$ and the system tolerable quantity in the decrease of the output of the fuel cell stack 2 when the next round of the power generation of the fuel cell stack 2 is restarted, and the method for computing the power generation shutdown time ts of the fuel cell stack 2 based on the anode pressure decrease quantity $\Delta Pa$ and the tolerable quantity of the degradation in the cathode catalyst will be explained.

Figure 15:
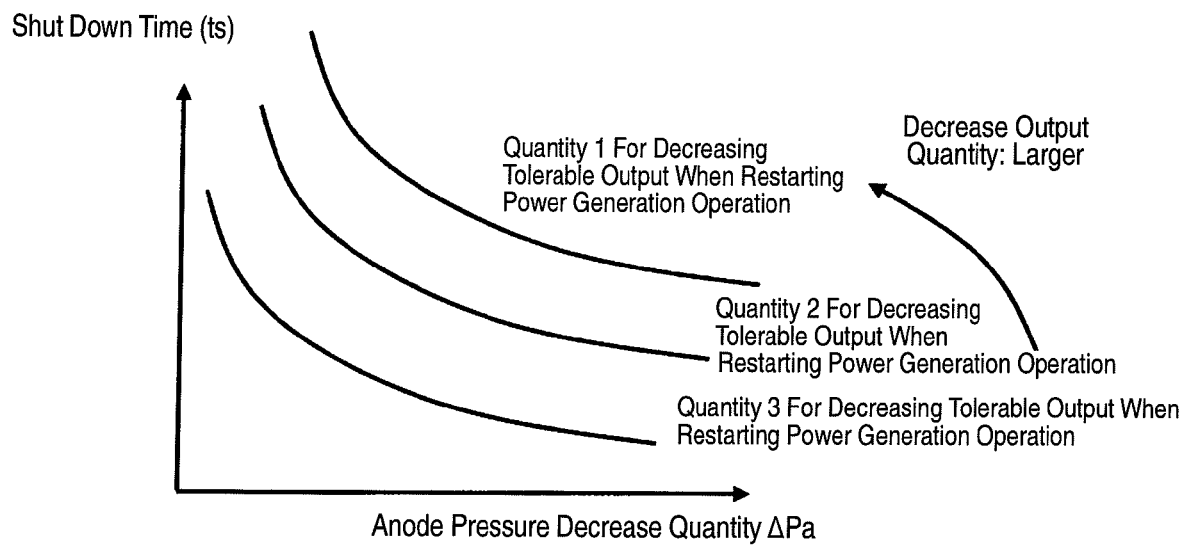
FIG. 15 is a graph conceptually illustrating an example of map data representing the relationship between the anode pressure decrease quantity, the tolerable output decrease quantity of the fuel cell stack in the restart operation, and the power generation shutdown time of the fuel cell stack.

FIG. 15 is a diagram illustrating an example of the map indicating the relationship between the anode pressure decrease quantity $\Delta Pa$ and the tolerable output decrease quantity of the fuel cell stack 2 during the power generation shutdown time ts of the fuel cell stack 2. As shown in FIG. 15, the greater that the anode pressure decrease quantity $\Delta Pa$ is, and as the tolerable output decrease quantity of the fuel cell stack 2 becomes smaller when the power generation operation is restarted, the power generation shutdown time ts of the fuel cell stack 2 becomes shorter.

Figure 16:
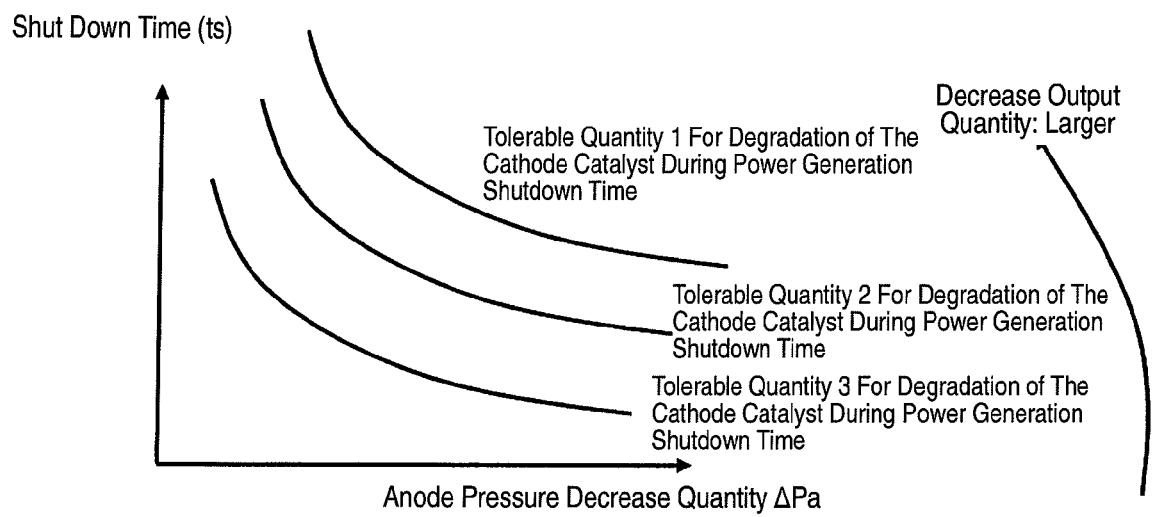
FIG. 16 is a graph conceptually illustrating an example of map data representing the relationship between the anode pressure decrease quantity, the tolerable degradation quantity of the cathode catalyst layer during the operation shutdown time of the fuel cell stack, and the power generation shutdown time of the fuel cell stack.

FIG. 16 is a diagram illustrating an example of the map indicating the relationship between the anode pressure decrease quantity $\Delta Pa$, the tolerable degradation quantity of the cathode catalyst during the power generation shutdown of the fuel cell stack 2, and the power generation shutdown time ts of the fuel cell stack 2. As shown in FIG. 16, as the anode pressure decrease quantity $\Delta Pa$ becomes greater, and the tolerable degradation quantity of the cathode catalyst during the power generation shutdown of the fuel cell stack 2 becomes smaller, and the power generation shutdown time ts of the fuel cell stack 2 becomes shorter.

For the fuel cell system in the fourth embodiment as explained above, the quantity of the decrease in the pressure in the anode system right before the shutdown of the power generation operation of the fuel cell is determined; corresponding to the quantity of the decrease in the pressure in the anode system, the condition is set for the execution of the shutdown/restart operation of the fuel cell. As a result, in the anode gas non-circulating-type fuel cell system, in consideration of (by determining) the anode gas concentration in the position where the anode gas concentration is locally lower, it is possible to appropriately set the condition for the execution of the shutdown/restart operation of the fuel cell. Consequently, preventing the degradation of the cathode catalyst during the power generation shutdown time is possible, and preventing the degradation in the responsiveness of the output after the restart of the operation is possible.

Figure 17:
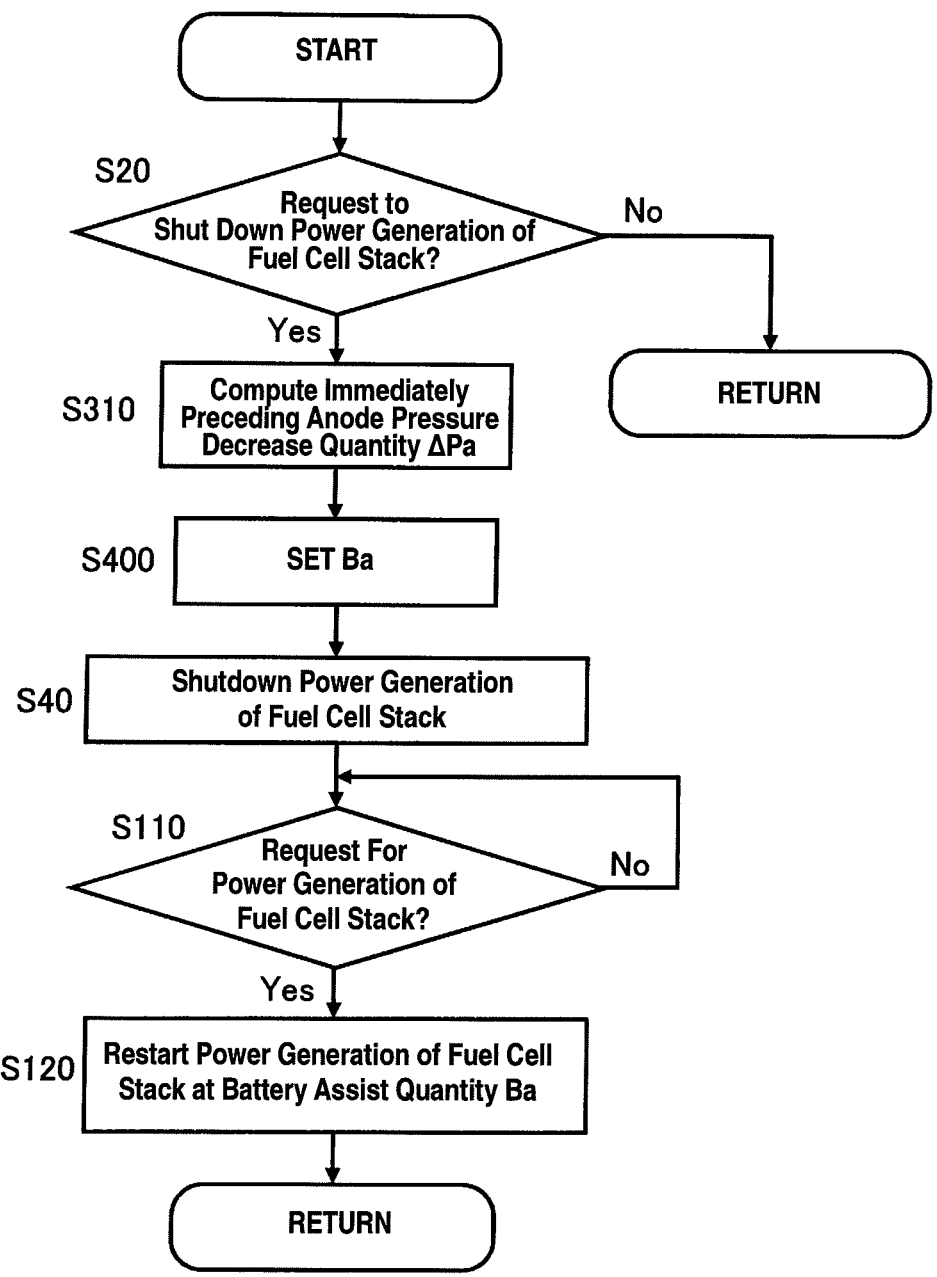
FIG. 17 is a flow chart illustrating a process executed by the controller for setting the condition for executing the shutdown/restart operation of the fuel cell stack by the fuel cell system in accordance with the fifth embodiment.

FIG. 17 is a flow chart illustrating the condition for the execution of the shutdown/restart operation of the fuel cell stack 2 in the fifth embodiment. The same reference numerals as those used for the steps of the operation in the process in the flow chart shown in FIG. 10 and FIG. 14 are used, so that they will not be explained in detail again.

In step S20, if a determination is made that there is a request to shut down the power generation of the fuel cell stack 2, then the process goes to step S310, and the anode pressure decrease quantity $\Delta Pa$ occurring right before the step is computed.

In step S400, based on the anode pressure decrease quantity $\Delta Pa$ computed in step S310, the battery assisting quantity Ba is set when the power generation operation is restarted for the fuel cell stack 2 in the shutdown state.

Figure 18:
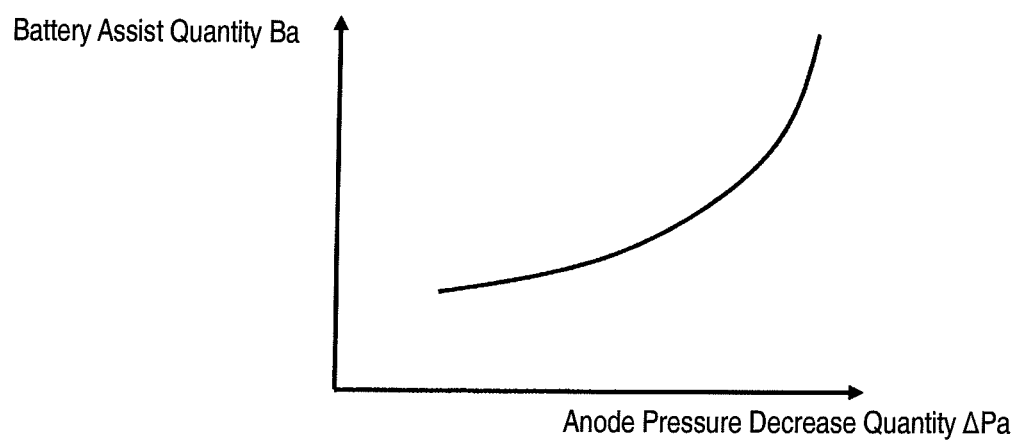
FIG. 18 is a graph conceptually illustrating an example of map data representing the relationship between the anode pressure decrease quantity and the battery assisting quantity.

FIG. 18 is a diagram illustrating an example of the map indicating the relationship between the anode pressure decrease quantity $\Delta Pa$ and the battery assisting quantity Ba. Here, the relationship between the anode pressure decrease quantity $\Delta Pa$ and the quantity of the decrease in the output of the fuel cell stack 2 when the power generation operation is restarted is determined experimentally beforehand, and the quantity of the decrease in the output of the fuel cell stack 2 when the power generation operation is restarted is set as the battery assisting quantity Ba. As shown in FIG. 18, as the anode pressure decrease quantity $\Delta Pa$ becomes smaller, the battery assisting quantity Ba also becomes smaller.

According to the fuel cell system in the fifth embodiment explained above, the quantity of the decrease in the output of the fuel cell stack right before the restart of the power generation operation is determined. The greater that the determined quantity of the decrease in pressure in the anode system is, the greater the battery assisting quantity when the power generation operation of the fuel cell is restarted. Consequently, it is possible to prevent the decrease in the responsiveness of the output of the overall system.

Figure 19:
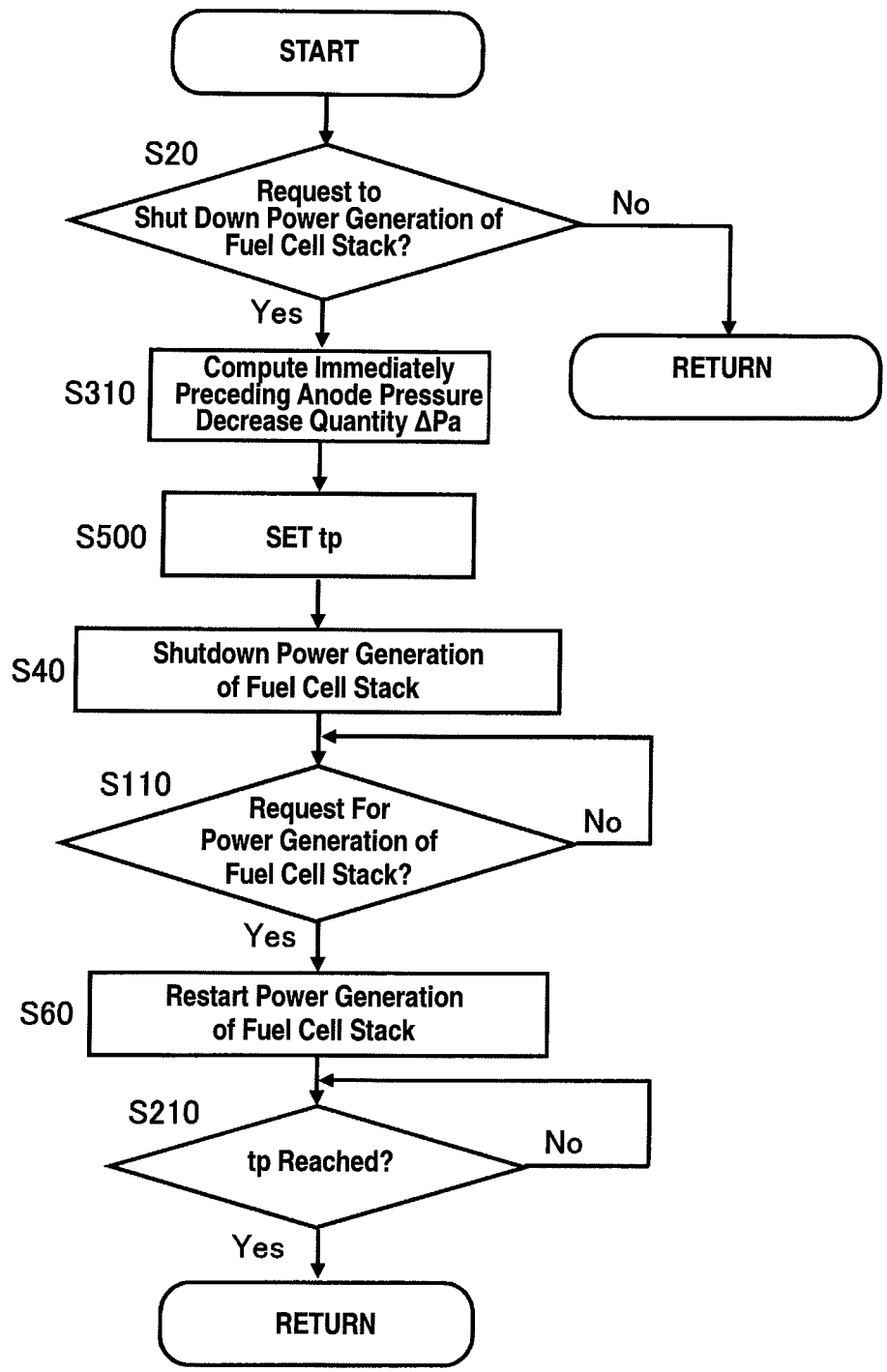
FIG. 19 is a flow chart illustrating a process executed by the controller setting the condition for executing the shutdown/restart operation of the fuel cell stack by the fuel cell system in accordance with the sixth embodiment.

FIG. 19 is a flow chart illustrating the process for setting the condition for the execution of the shutdown/restart operation of the fuel cell stack 2 by the fuel cell system in the sixth embodiment. The same reference numerals as those used in the process shown in the flow chart in FIG. 12 and FIG. 14 are used here, so that they will not be explained in detail again.

If a determination is made that there is a request to shut down the power generation of the fuel cell stack 2, then the process goes to step S310, and the anode pressure decrease quantity ΔPa occurring right before the step is computed.

In step S500, based on the anode pressure decrease quantity ΔPa computed in step S310, the re-shutdown prohibition time tp from the restart of the power generation operation of the fuel cell stack 2 until the shutdown again of the power generation operation is resumed.

Figure 20:
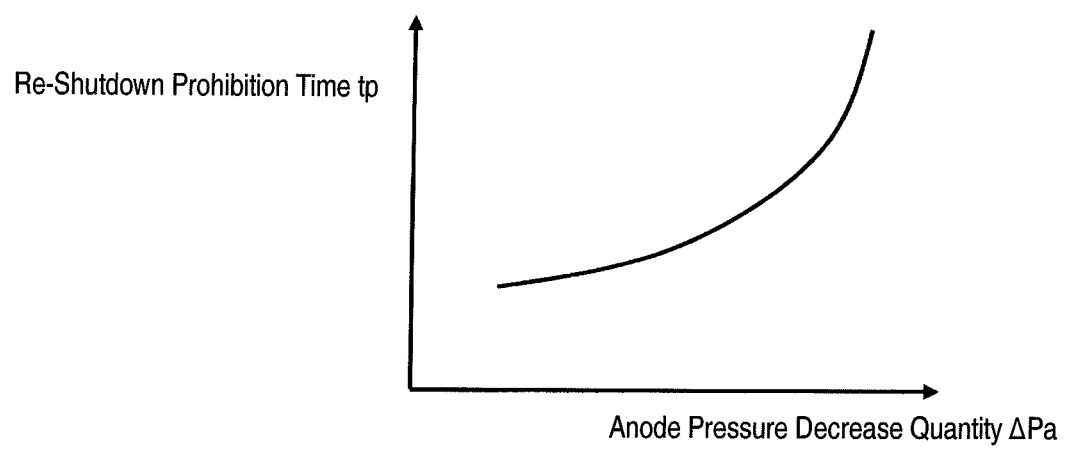
FIG. 20 is a graph conceptually illustrating an example of map data representing the relationship between the anode pressure decrease quantity and the re-shutdown prohibition time.

FIG. 20 is a diagram illustrating an example of the map indicating the relationship between the anode pressure decrease quantity ΔPa and the re-shutdown prohibition time tp.

When the vehicle is in the idle stop mode, as the power generation operation of the fuel cell stack 2 is shut down, under the influence of the nitrogen and oxygen cross-leaked from the cathode to the anode, the lowest concentration of the anode gas in the flow channel decreases. When the idle stop (the shutdown of the power generation operation of the fuel cell stack 2) is carried out repeatedly, the lowest concentration of the anode gas in the flow chart gradually decreases. Consequently, the relationship between the anode pressure decrease quantity ΔPa and the time needed for the lowest anode gas concentration Cmin in the flow channels after the recovery from the idle stop (restart of the power generation operation of the fuel cell stack 2) to reach a prescribed concentration level is determined by experiment beforehand. Here, the time needed for the lowest anode gas concentration Cmin in the flow channels to increase to the prescribed concentration level is taken as the re-shutdown prohibition time tp until shutdown again of the power generation operation of the fuel cell stack 2. As a result, it is possible to prevent the continuous decrease in the lowest anode gas concentration Cmin in the flow channels due to the repeated shutdown of the power generation operation of the fuel cell stack 2.

According to the fuel cell system in the sixth embodiment, the quantity of the decrease in the pressure in the anode system right before the power generation shutdown of the fuel cell is determined. As the determined quantity of the decrease in the pressure in the anode system becomes greater, the re-shutdown prohibition time after restart of the power generation operation of the fuel cell until the shutdown again of the power generation is set to become longer. As a result, it is possible to prevent a continuous decrease in the anode gas concentration during the power generation shutdown time. As a result, preventing the degradation in the cathode catalyst during the power generation shutdown time is possible. In addition, preventing the degradation in the responsiveness of the output after the restart of the operation is possible.

The present invention is not restricted to the embodiments described above. For example, an explanation was given by citing an example wherein the fuel cell system was installed in a vehicle. However, the present invention can also be applied to various items other than a vehicle.

Moreover, while the fuel cell system is illustrated as an anode non-circulation type fuel cell system, the present invention can also be used with a circulating type of a fuel cell system.

The lowest anode gas concentration Cmin in the flow channels was estimated based on the amount of the anode pressure decrease quantity ΔPa and the buffer concentration Cbuff_pre before the down transition. However, it is possible to provide a plurality of sensors for detecting the anode gas concentration to detect the lowest anode gas concentration. Additionally, the position when the anode gas concentration is the lowest can be determined experimentally beforehand, and a sensor for detecting the anode gas concentration is set at this position.

The controls in the embodiments described above can be combined appropriately. Furthermore, the present invention can also be applied to a pulsation control of a circulating fuel cell system.

In understanding the scope of the present invention, the term "configured" as used herein to describe a component, section or part of a device includes hardware and software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fuel cell device comprising:
    a fuel cell configured to receive anode gas and cathode gas to generate electric power;
    a control valve configured to control pressure of the anode gas being fed to the fuel cell; and
    a controller including
        a pulsation operation control section programmed to control the control valve so that the pressure of the anode gas flowing downstream of the control valve is periodically increased and decreased,
        a shutdown/restart control section programmed to execute a shutdown/restart operation of the fuel cell by closing the control valve to stop feeding of the anode gas and shutting down power generation of the fuel cell upon receiving a shutdown command to shut down the power generation, and opening the control valve to restart the feeding of the anode gas and restart the power generation upon a prescribed operation restart condition being met,
        an anode gas concentration acquiring section programmed to estimate a lowest anode gas concentration at a stagnation point during which an anode gas flow rate is zero within a power generation region of the fuel cell, the lowest anode gas concentration being estimated based on a control state of the anode gas at a time the shutdown command is issued, and
        an execution condition setting section programmed to execute the shutdown/restart operation of the fuel cell based on the lowest anode gas concentration that was estimated by the anode gas concentration acquiring section.

2. The fuel cell device according to claim 1, wherein the execution condition setting section sets a power generation shutdown time of the fuel cell to a shorter time as the lowest anode gas concentration estimated by the anode gas concentration acquiring section becomes lower.

3. The fuel cell device according to claim 1, wherein the execution condition setting section sets a output quantity of a battery that assists an output of the fuel cell when the power generation operation of the fuel cell is restarted to a higher value as the anode gas concentration estimated by the anode gas concentration acquiring section becomes lower.

4. The fuel cell device according to claim 2, wherein the execution condition setting section sets a output quantity of a battery that assists an output of the fuel cell when the power generation operation of the fuel cell is restarted to a higher value as the anode gas concentration estimated by the anode gas concentration acquiring section becomes lower.

5. The fuel cell device according to claim 1, wherein the execution condition setting section sets a re-shutdown prohibition time from a restart of the power generation operation of the fuel cell until shutdown again of the power generation operation to a longer time as the lowest anode gas concentration estimated by the anode gas concentration acquiring section becomes lower.

6. The fuel cell device according to claim 2, wherein the execution condition setting section sets a re-shutdown prohibition time from a restart of the power generation operation of the fuel cell until shutdown again of the power generation operation to a longer time as the lowest anode gas concentration estimated by the anode gas concentration acquiring section becomes lower.

7. The fuel cell device according to claim 1, wherein the execution condition setting section sets a re-shutdown prohibition time from a restart of the power generation operation of the fuel cell until shutdown again of the power generation operation to a longer time as the lowest anode gas concentration estimated by the anode gas concentration acquiring section becomes lower.

8. The fuel cell device according to claim 1, wherein the fuel cell device is configured as an anode non-circulation type fuel cell device.

9. The fuel cell device according to claim 8, further comprising
a buffer component configured to store anode-off gas emitted from the fuel cell.

10. The fuel cell device according to claim 1, further comprising
a buffer component configured to store anode-off gas emitted from the fuel cell.

11. A fuel cell device comprising:
a fuel cell configured to receive anode gas and cathode gas to generate electric power;
a control valve configured to control pressure of the anode gas being fed to the fuel cell; and
a controller including
a pulsation operation control section programmed to control the control valve so that the pressure of the anode gas flowing downstream of the control valve is periodically increased and decreased,
a shutdown/restart control section programmed to execute a shutdown/restart operation of the fuel cell by closing the control valve to stop feeding of the anode gas and shutting down power generation of the fuel cell upon receiving a shutdown command to shut down the power generation, and opening the control valve to restart the feeding of the anode gas and restart the power generation upon a prescribed operation restart condition being met,
an anode gas concentration acquiring section programmed to estimate an anode gas concentration at a location where the anode gas concentration is locally lower within a power generation region of the fuel cell based on a control state of the anode gas at a time the shutdown command is issued,
an execution condition setting section programmed to execute the shutdown/restart operation of the fuel cell based on the anode gas concentration that was estimated by the anode gas concentration acquiring section, and
an anode pressure drop acquiring section programmed to estimate an anode pressure decrease quantity that is a differential pressure between an anode pressure within the fuel cell right before the control valve is fully closed during pulsation operation and a current anode pressure within the fuel cell, the anode gas concentration acquiring section estimating the anode gas concentration at the location where the anode gas concentration is locally lower based on the anode pressure decrease quantity.

12. The fuel cell device according to claim 11, wherein the execution condition setting section sets a power generation shutdown time of the fuel cell to a shorter time as the anode pressure decrease quantity becomes greater.

13. The fuel cell device according to claim 11, wherein the execution condition setting section sets an output quantity of the battery that assists an output of the fuel cell when the power generation operation of the fuel cell is restarted to a higher value as the anode pressure decrease quantity becomes greater.

14. The fuel cell device according to claim 12, wherein the execution condition setting section sets an output quantity of the battery that assists an output of the fuel cell when the power generation operation of the fuel cell is restarted to a higher value as the anode pressure decrease quantity becomes greater.

15. The fuel cell device according to claim 11, wherein the execution condition setting section sets a re-shutdown prohibition time after the restart of the power generation operation of the fuel cell until re-shutdown of the power generation to a longer time as the anode pressure decrease quantity becomes greater.

16. The fuel cell device according to claim 12, wherein the execution condition setting section sets a re-shutdown prohibition time after the restart of the power generation operation of the fuel cell until re-shutdown of the power generation to a longer time as the anode pressure decrease quantity becomes greater.

17. The fuel cell device according to claim 13, wherein the execution condition setting section sets a re-shutdown prohibition time after the restart of the power generation operation of the fuel cell until re-shutdown of the power generation to a longer time as the anode pressure decrease quantity becomes greater.

18. The fuel device according to claim 14, wherein the execution condition setting section sets a re-shutdown prohibition time after the restart of the power generation operation of the fuel cell until the re-shutdown of the power generation to a longer time as the anode pressure decrease quantity becomes greater.

* * * * *